United States Patent
Miller et al.

(10) Patent No.: US 8,646,595 B2
(45) Date of Patent: Feb. 11, 2014

(54) SNAP-ON CONVEYOR BELT ROLLERS

(75) Inventors: Abraham L. Miller, Gulfport, MS (US); Gibert J. MacLachlan, Harahan, LA (US); David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 24 days.

(21) Appl. No.: 13/327,386

(22) Filed: Dec. 15, 2011

(65) Prior Publication Data

US 2012/0318644 A1 Dec. 20, 2012

Related U.S. Application Data

(63) Continuation-in-part of application No. 13/113,517, filed on May 23, 2011, now Pat. No. 8,474,602.

(51) Int. Cl.
*B65G 17/24* (2006.01)
(52) U.S. Cl.
USPC .............................. 198/779; 198/850; 193/37
(58) Field of Classification Search
USPC ...................... 198/850, 852, 853, 779; 193/37
See application file for complete search history.

(56) References Cited

U.S. PATENT DOCUMENTS

| | | | | |
|---|---|---|---|---|
| 569,663 A * | 10/1896 | Perkins | | 474/95 |
| 1,758,280 A * | 5/1930 | Evans | | 193/37 |
| 3,657,779 A * | 4/1972 | Granberry | | 198/842 |
| 4,402,390 A * | 9/1983 | Feeney | | 193/37 |
| 4,993,540 A | 2/1991 | van Capelleveen | | |
| 5,378,203 A | 1/1995 | Baebel | | |
| 5,868,036 A * | 2/1999 | Salzman | | 74/450 |
| 6,146,299 A | 11/2000 | Harvey | | |
| 6,237,755 B1 | 5/2001 | Clopton | | |
| 6,494,312 B2 | 12/2002 | Costanzo | | |
| 6,527,106 B2 | 3/2003 | Tanabe et al. | | |
| 6,874,617 B1 | 4/2005 | Layne | | |
| 7,137,505 B2 | 11/2006 | Stebnicki et al. | | |
| 7,331,448 B2 | 2/2008 | Stebnicki et al. | | |
| 7,527,143 B2 | 5/2009 | Krisl et al. | | |
| 7,540,368 B2 | 6/2009 | Weiser | | |
| 7,556,136 B2 | 7/2009 | Marshall et al. | | |
| 7,886,892 B2 | 2/2011 | Fourney | | |
| 8,327,614 B1 * | 12/2012 | Tegeler et al. | | 59/4 |
| 2005/0072656 A1 | 4/2005 | Costanzo | | |

(Continued)

FOREIGN PATENT DOCUMENTS

DE 202010012829 U1 8/2007
EP 1921027 A1 5/2008

OTHER PUBLICATIONS

International Search Report and Written Opinion of the International Searching Authority, PCT/US2012/038820, mailed Aug. 8, 2012, European Patent Office, Rijswijk, NL.

(Continued)

*Primary Examiner* — Gene Crawford
*Assistant Examiner* — Keith R Campbell
(74) *Attorney, Agent, or Firm* — Catherine M. Bishop; James T. Cronvich

(57) ABSTRACT

Snap-on rollers for a conveyor belt. The snap-on roller may be snapped onto an axle or into a cavity of a conveyor belt module. Multi-piece snap-on rollers can be installed radially onto an axle on a conveyor belt and joined together in a puzzle pattern to form a complete roller that can rotate on the axle.

48 Claims, 16 Drawing Sheets

(56) References Cited

U.S. PATENT DOCUMENTS

2007/0181402 A1    8/2007   Fourney
2007/0263952 A1*   11/2007   Tsumori et al. .............. 384/564
2010/0051412 A1    3/2010   DeLanghe

OTHER PUBLICATIONS

Schaefer Legendary Strength Snapfurl CF-700 Owners Manual, Sep. 8, 2003, Schaefer Marine Inc., New Bedford, MA.

* cited by examiner

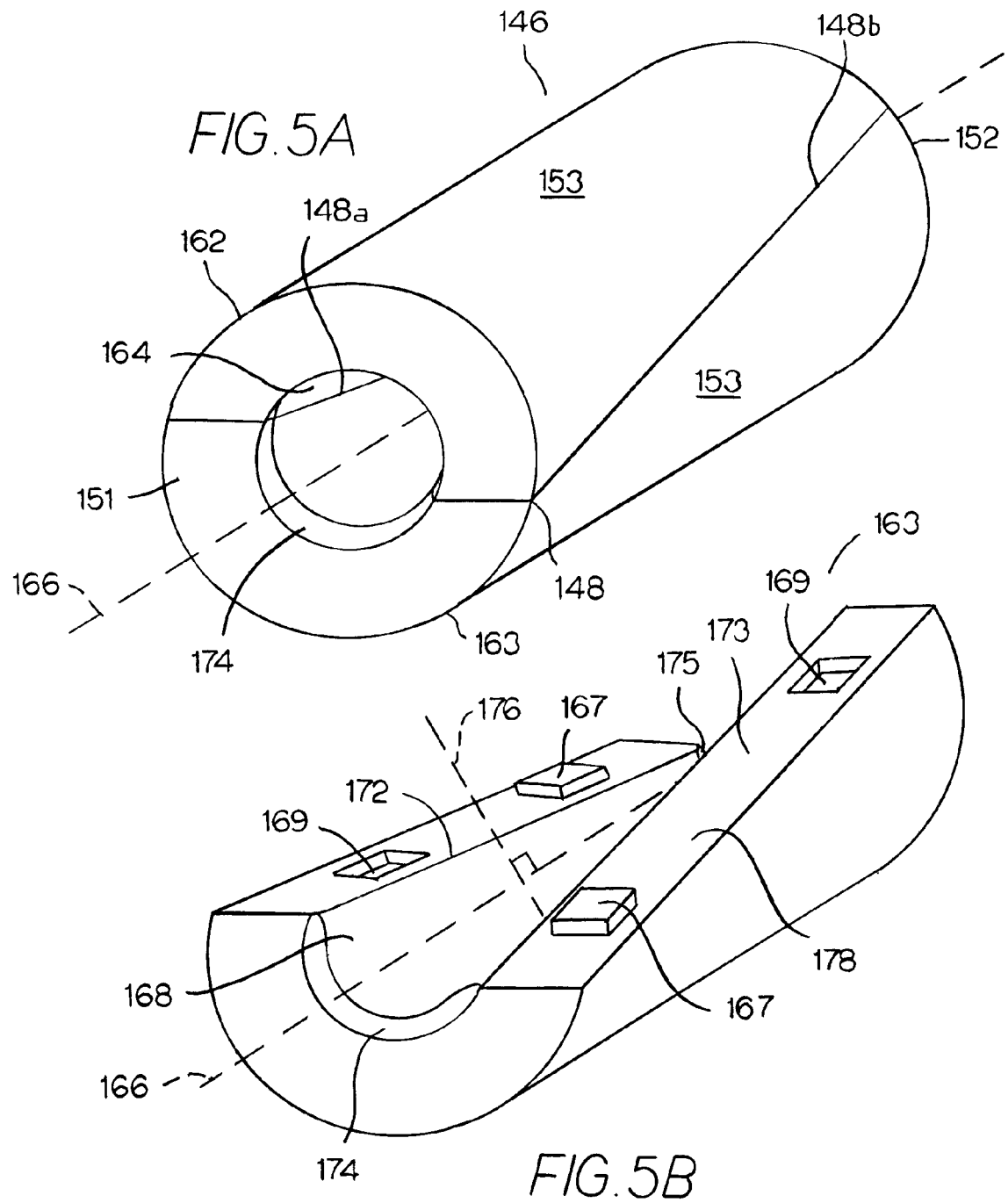

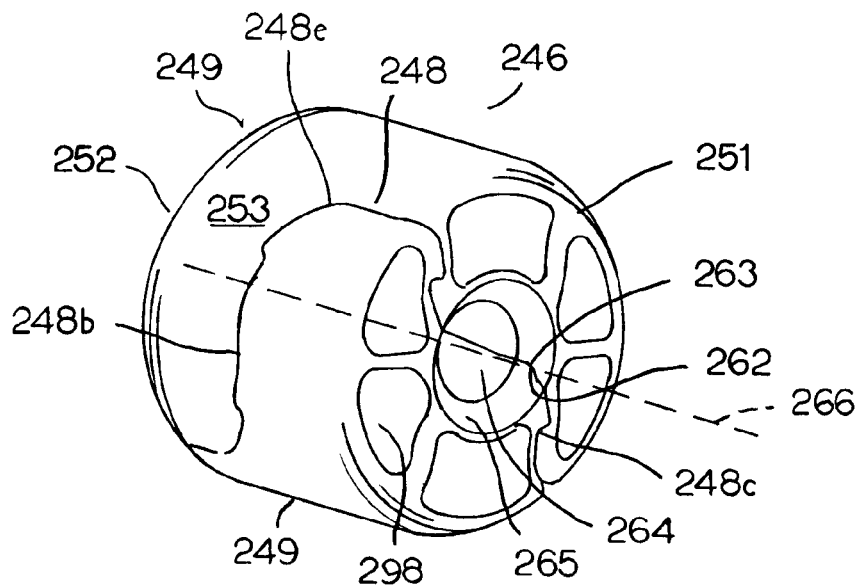
FIG. 12A
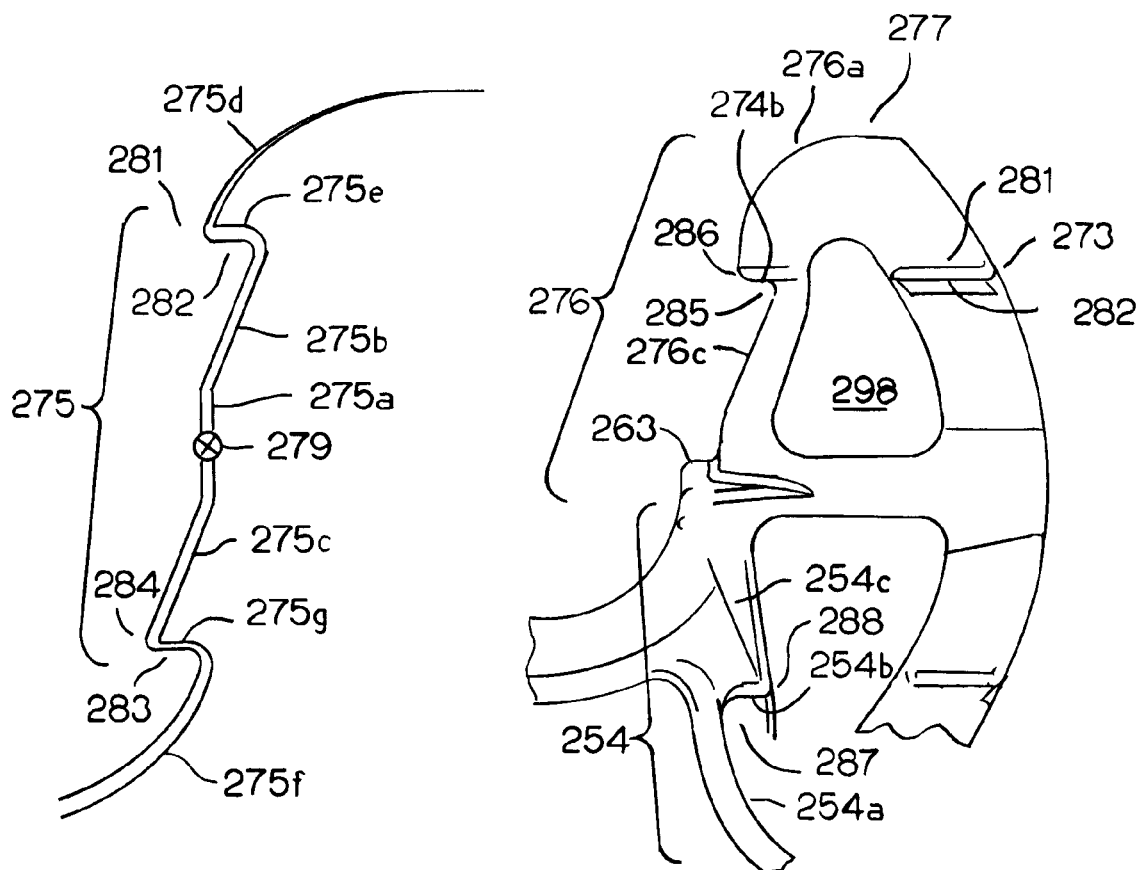
FIG. 13
FIG. 14

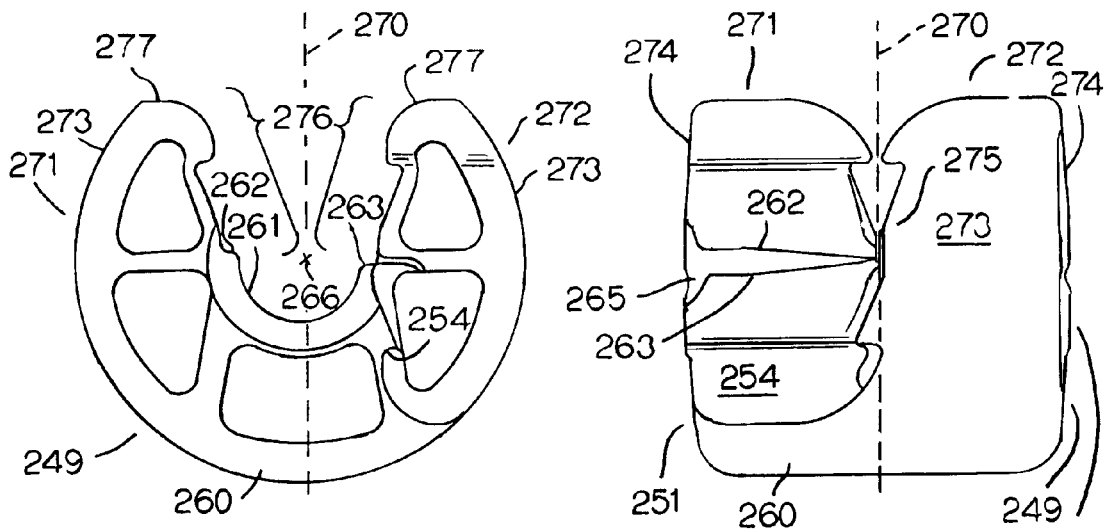
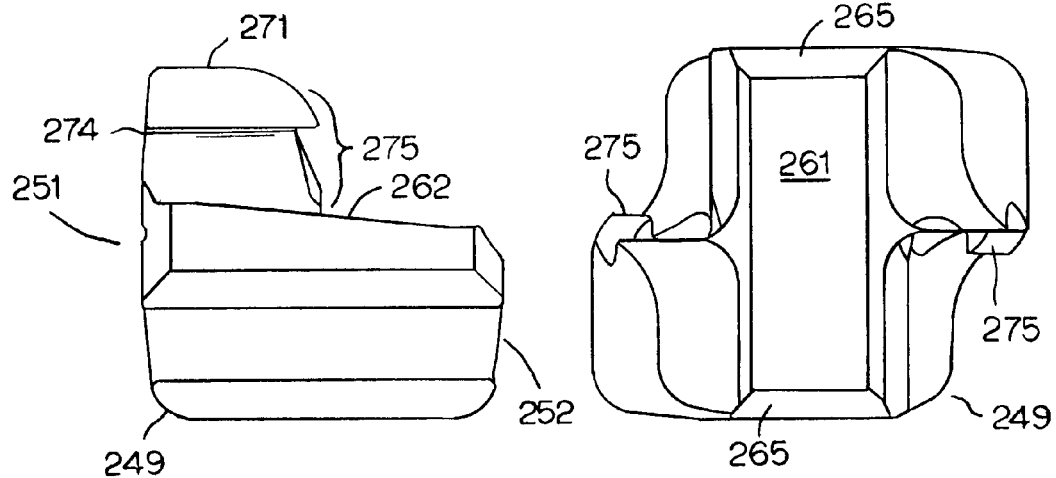
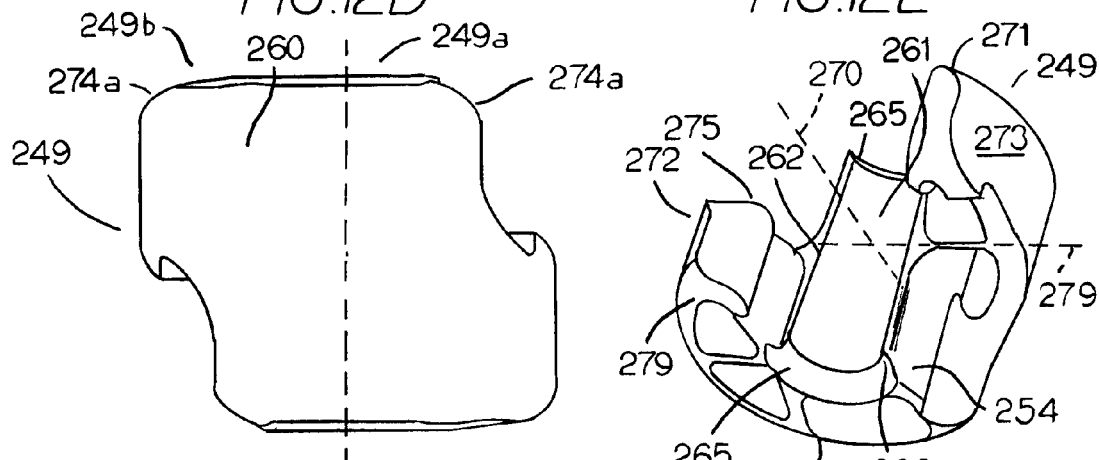

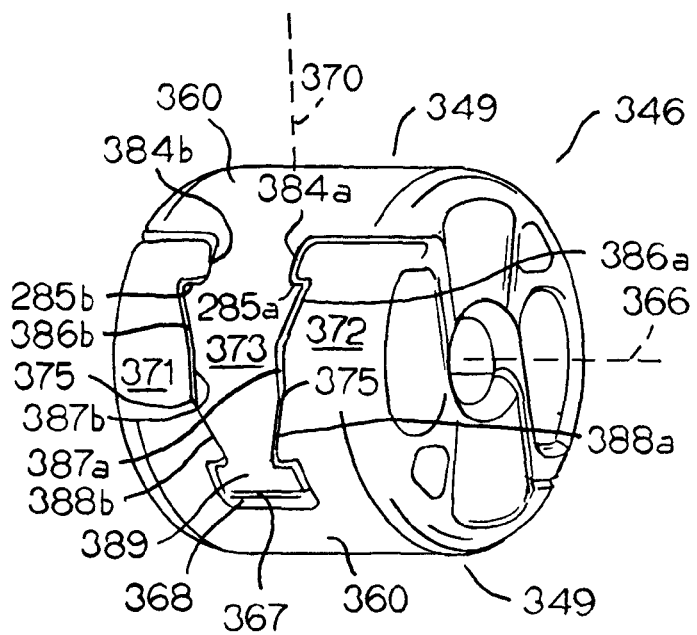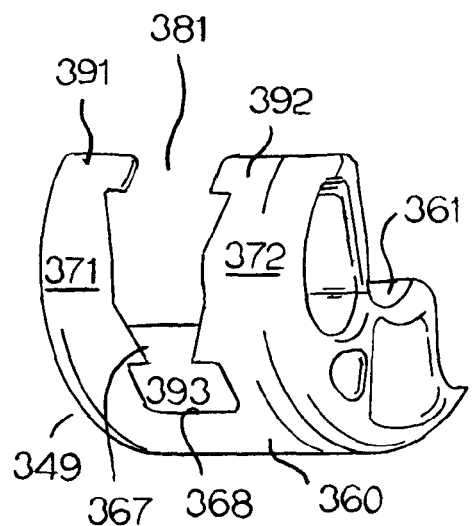
FIG. 15A    FIG. 15B
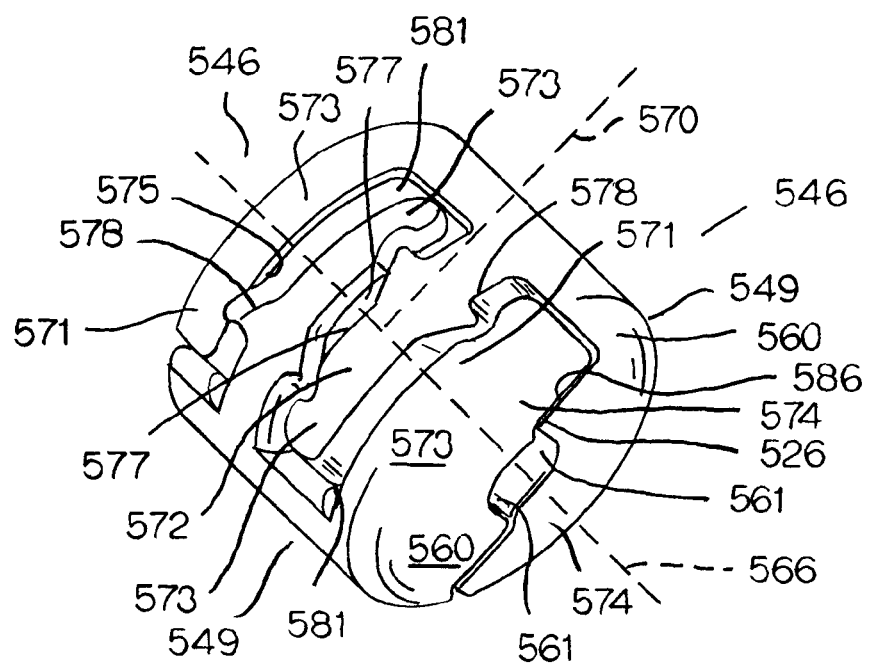
FIG. 17

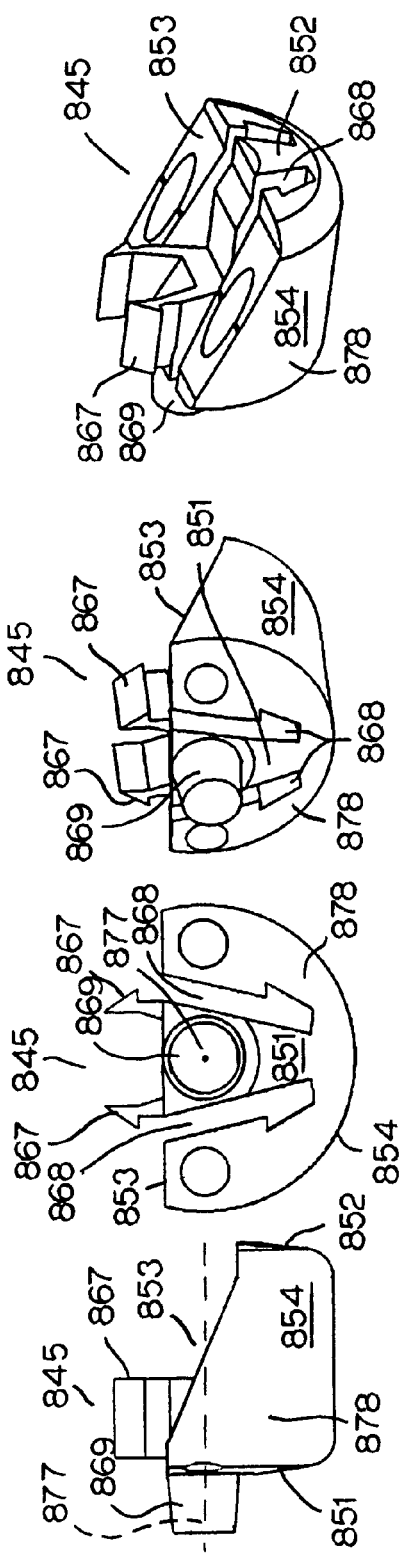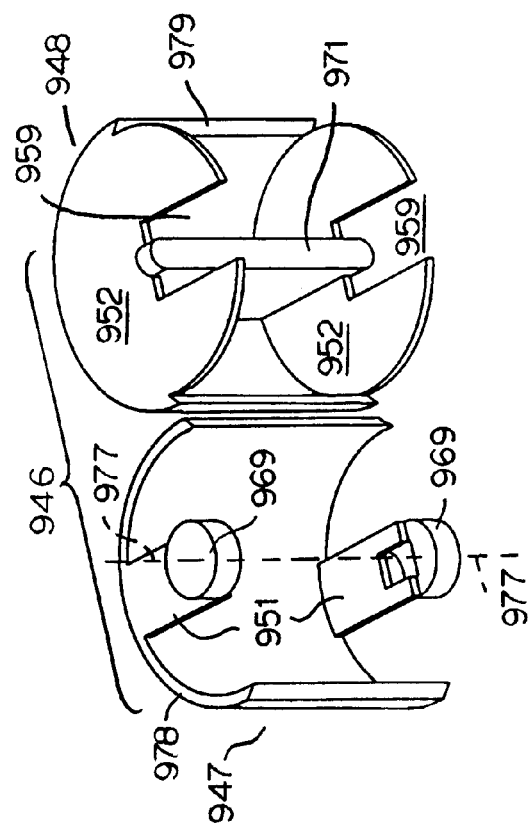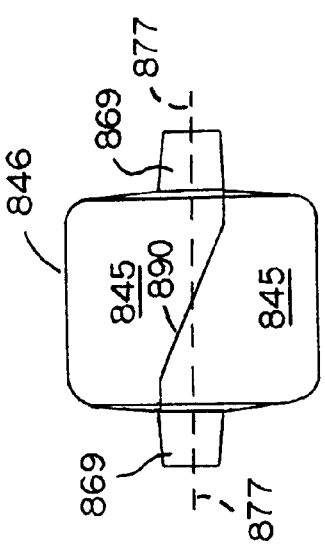

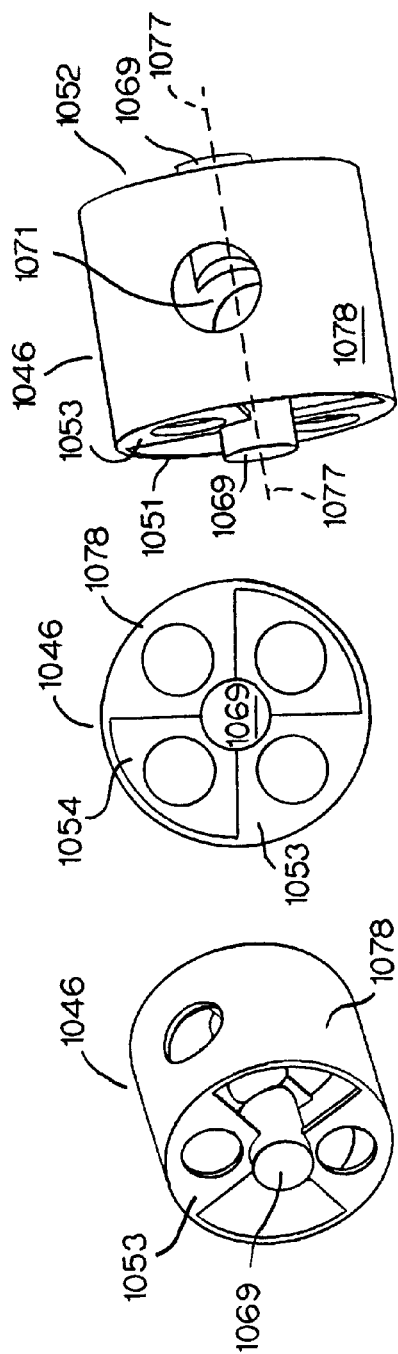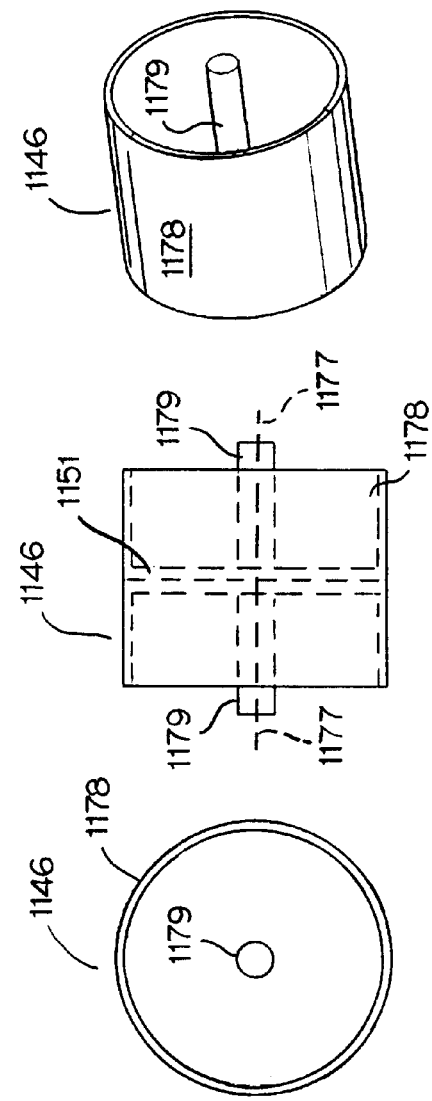

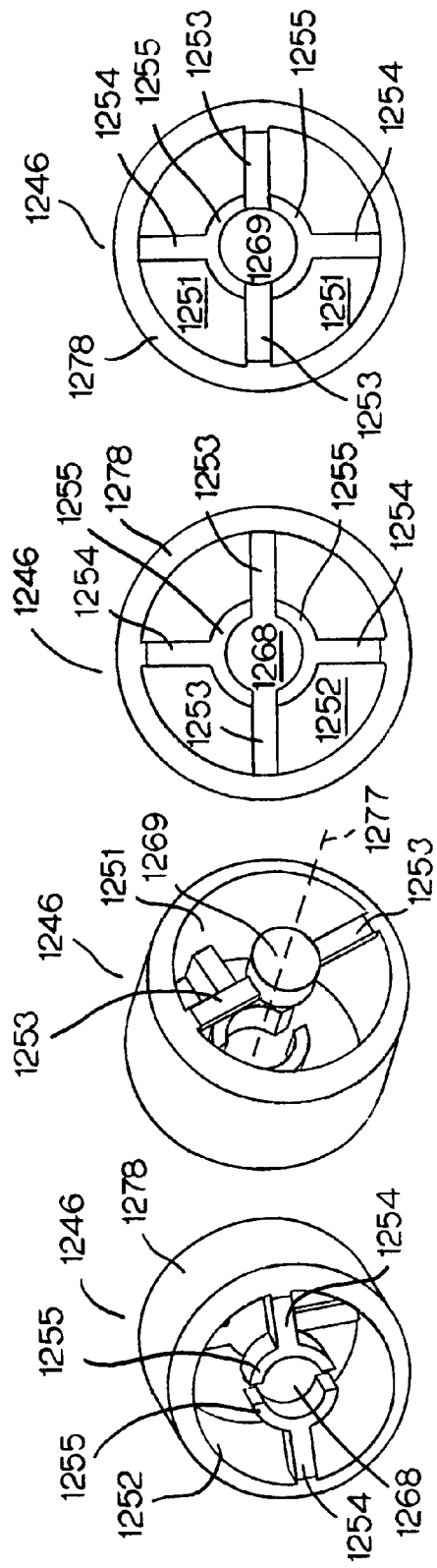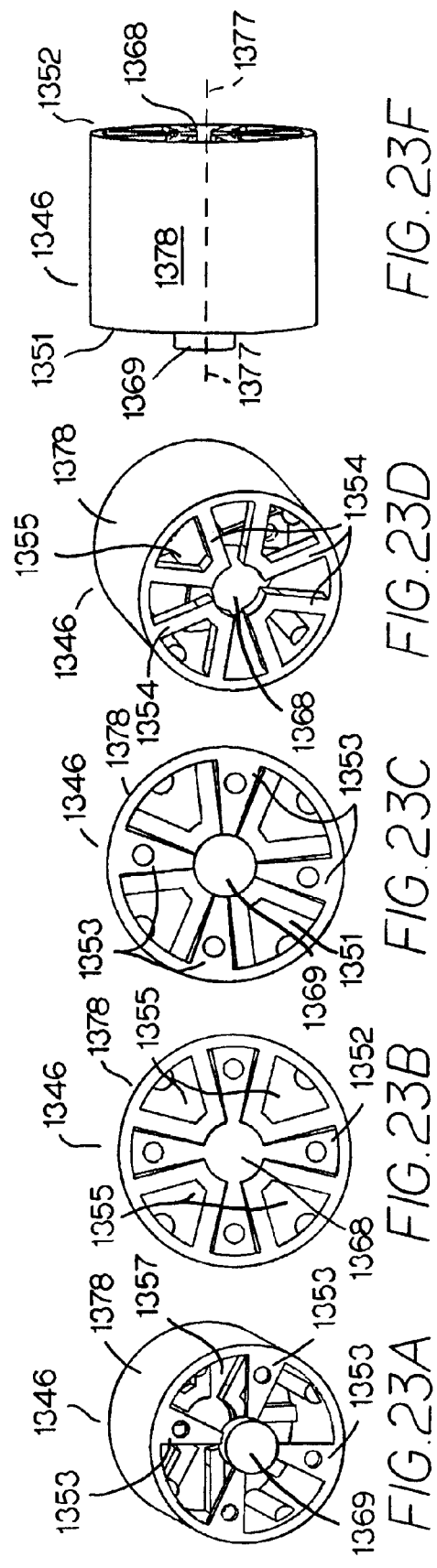

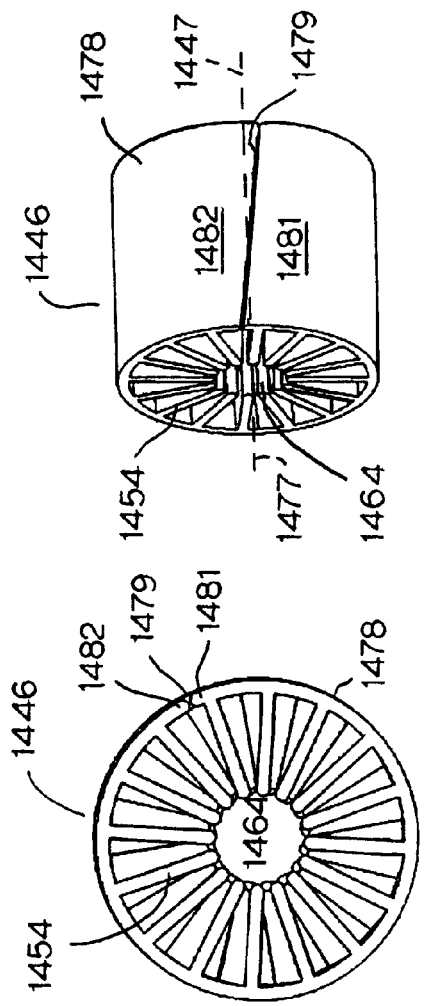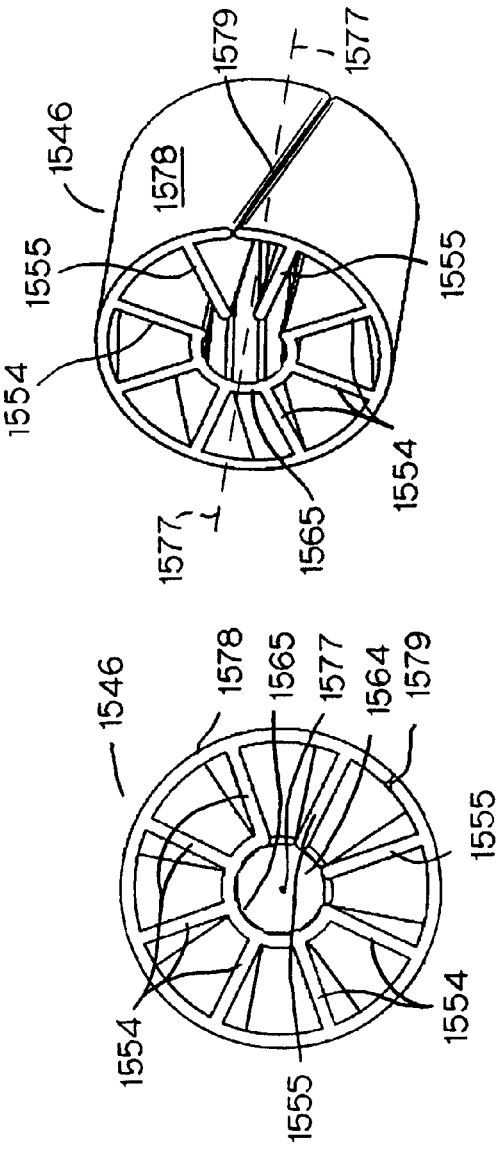

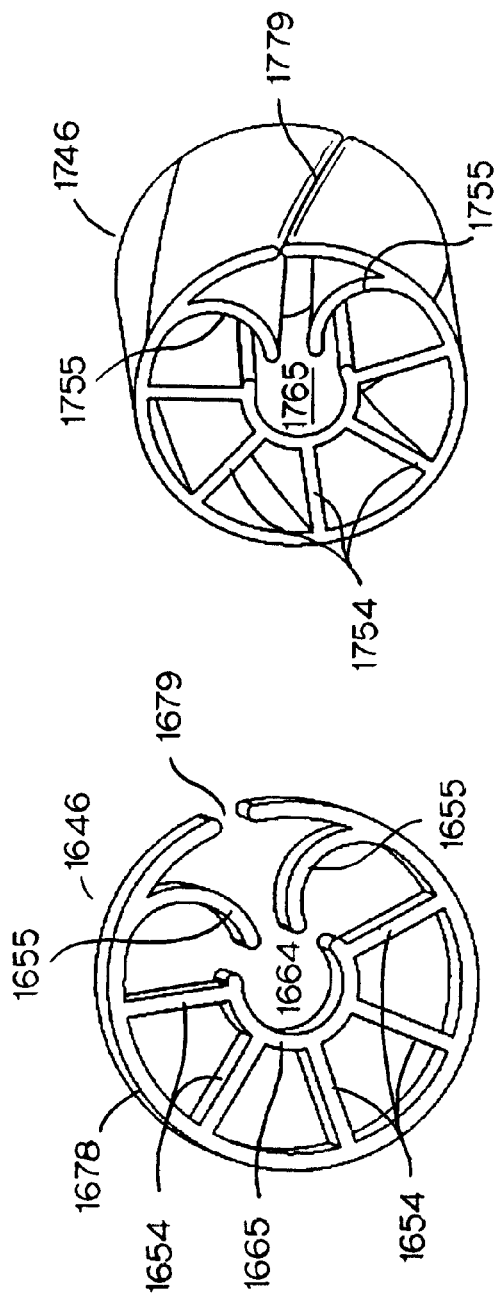
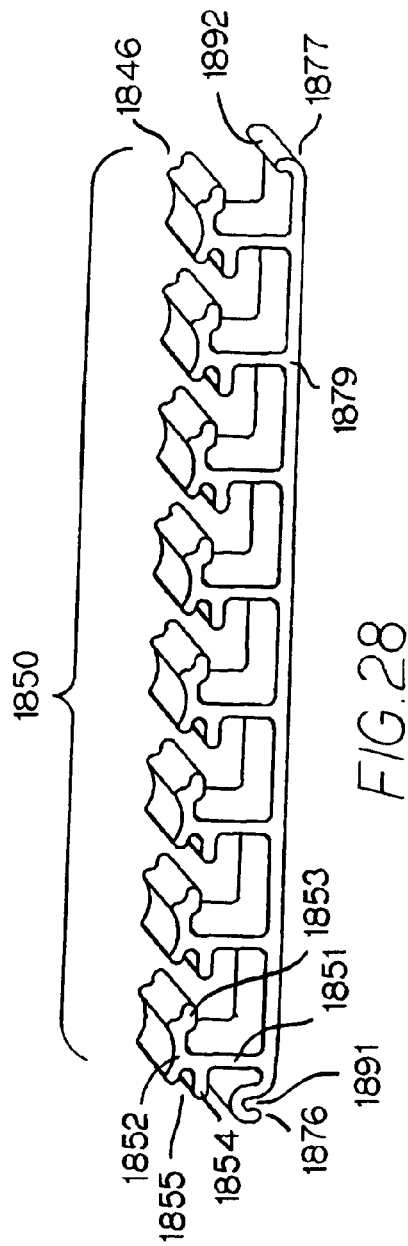
FIG. 27
FIG. 26
FIG. 28

SNAP-ON CONVEYOR BELT ROLLERS

RELATED APPLICATIONS

The present application is a continuation-in-part of U.S. patent application Ser. No. 13/113,517, filed May 23, 2011 and entitled "Multi-Piece Conveyor Belt Rollers", the contents of which are incorporated by reference.

BACKGROUND

The invention relates generally to power-driven conveyors and more particularly to multi-piece article-supporting rollers for conveyor belts.

Article-supporting rollers are used in modular plastic conveyor belts to provide low-friction rolling support to conveyed articles. In many roller-top belts, the rollers are mounted on steel axles in cavities formed in the belt modules used to construct the modular belt. Roller-top belt modules with steel axles are more difficult to manufacture than standard modules without rollers. One way to manufacture a roller-top module is to injection-mold the module around a roller on a steel axle. The ends of the axle extend into the mold and are encapsulated in the molded module body. Another way is to injection-mold a module body with a receptacle for a roller. Then, in a secondary manufacturing step, a roller and axle are placed in each receptacle, and a cover is welded or otherwise retained in place over the ends of the axle to hold the roller in the module. Thus, there is a need to simplify the manufacture of roller-top belts.

SUMMARY

A snap-on roller embodying features of the invention and usable in a conveyor belt snaps into a conveyor belt module. The snap-on roller may include an integrated axle or be designed to snap directly onto an axle or axle nub in the conveyor belt module. The snap-on roller may comprise multiple pieces designed to mate together, or a single piece roller that wraps around an axle or snaps into a conveyor belt module.

In one embodiment a snap-on roller is a multi-piece roller that comprises first and second roller sections that fit together to form a complete roller. The complete roller has an outer periphery between opposite ends. Together, the first and second roller sections define a bore that extends along the central axis of the roller and opens onto the opposite ends for receiving an axle. The bore is formed in part by each of the first and second roller sections. Fingers on the first roller section engage with fingers on the second roller section. The two sections are assembled by sliding the two sections together in a direction perpendicular to the central axis of the complete roller. The fingers interlock to prevent axial separation of the first and second roller sections.

In one aspect of the invention, a multi-piece roller for a conveyor belt comprises a first roller section having a first torsioned channel and a second roller section having a second torsioned channel. The second roller section is joined to the first roller section to form a complete roller having a first axial end, a second axial end, an outer peripheral surface between the first axial end and the second axial end, and a bore defined by the first and second torsioned channels. The bore extends from the first axial end to the second axial end.

According to another aspect of the invention, a multi-piece roller for a conveyor belt comprises a rotationally symmetric first roller section and a second roller section joined to the first roller section to form a complete roller. The rotationally symmetric first roller section comprises a base member having an axially extending channel and a first finger extending from the base member. The first finger includes an axially outer surface, an axially inner surface, a radially inner surface and a radially outer surface, and forms at least a portion of the peripheral surface of the complete roller.

According to another aspect of the invention, a multi-piece roller for a conveyor belt comprises a first roller section comprising a base member including an axially extending channel and a plurality of first fingers extending from the base member, and a second roller section joined to the first roller section to form a complete roller. Each first finger includes a radially outer surface and a radially inner surface that is non-parallel with the radially outer surface. The complete roller has a first axial end, a second axial end, an outer periphery between the first axial end and the second axial end and a bore extending from the first axial end to the second axial end. The outer periphery is defined at least in part by the radially outer surfaces of the plurality of first fingers.

According to still another aspect of the invention, a roller section for forming a multi-piece roller in a conveyor belt comprises a base member having an axially extending channel, and a first finger extending from the base member. The first finger includes an axially outer surface, a rotationally symmetric axially inner surface, a radially outer surface and a radially inner surface that is non-parallel with the radially outer surface.

BRIEF DESCRIPTION OF THE DRAWINGS

These aspects and features of the invention, as well as its advantages, are described in more detail in the following description, appended claims, and accompanying drawings, in which:

FIG. 5A illustrates a complete multi-piece roller usable in a conveyor belt module as in FIG. 3 according to an illustrative embodiment of the invention;

FIG. 5B illustrates a roller section of the multi-piece roller of FIG. 5A;

FIG. 12A illustrates a multi-piece roller usable in a conveyor belt module as in FIG. 3 according to another embodiment of the invention;

FIG. 12B is a front view of a roller section of the multi-piece roller of FIG. 12A;

FIG. 12C is a side view of a roller section of the multi-piece roller of FIG. 12A;

FIG. 12D is a side view of roller section of FIG. 12C, bisected;

FIG. 12E is a top view of the roller section of FIG. 12B;

FIG. 12F is a bottom view of the roller section of FIG. 12B;

FIG. 12G is a perspective view of the roller section of FIG. 12B;

FIG. 13 illustrates in detail the axially inner surface of a finger of the roller section of FIG. 12B according to an illustrative embodiment of the invention;

FIG. 14 illustrates in detail the radially inner surface of a finger of the roller section of FIG. 12B according to an illustrative embodiment of the invention;

FIGS. 15A and 15B illustrate a multi-piece roller according to another embodiment of the invention;

FIG. 17 illustrates a multi-piece roller according to another embodiment of the invention;

FIGS. 18A-D illustrate various views of a roller section for a multi-piece roller according to another embodiment of the invention;

FIG. 18E illustrates a multi-piece roller comprised of two of the roller sections shown in FIGS. 18A-D;

FIG. 19 illustrates a multi-piece roller comprising two roller sections according to another embodiment of the invention;

FIGS. 20A-C illustrate a one-piece snap-on roller according to an embodiment of the invention;

FIGS. 21A-C illustrate another embodiment of a one-piece snap-on roller including flexible axle nubs;

FIGS. 22A-D illustrate a one-piece snap-on roller including an axle nub on a first axial end and a recess on a second axial end;

FIGS. 23A-E illustrate another embodiment of a one-piece snap-on roller according to another embodiment of the invention;

FIGS. 24A-B illustrate a one-piece snap-on roller including a bore extending therethrough for receiving an axle according to another illustrative embodiment of the invention;

FIGS. 25A-B illustrate another embodiment of a one-piece snap-on roller including a bore extending therethrough;

FIG. 26 illustrates a one-piece snap-on roller according to another embodiment of the invention;

FIG. 27 illustrates a one-piece snap-on roller according to another embodiment of the invention;

FIG. 28 illustrates a one-piece snap-on roller comprising a flexible, flat substrate having an array of ribs according to another embodiment of the invention;

DETAILED DESCRIPTION

The present invention provides a snap-on roller for use in a conveyor belt. The present invention will be described below relative to illustrative embodiments. Those skilled in the art will appreciate that the present invention may be implemented in a number of different applications and embodiments and is not specifically limited in its application to the particular embodiments depicted.

Figure 1:
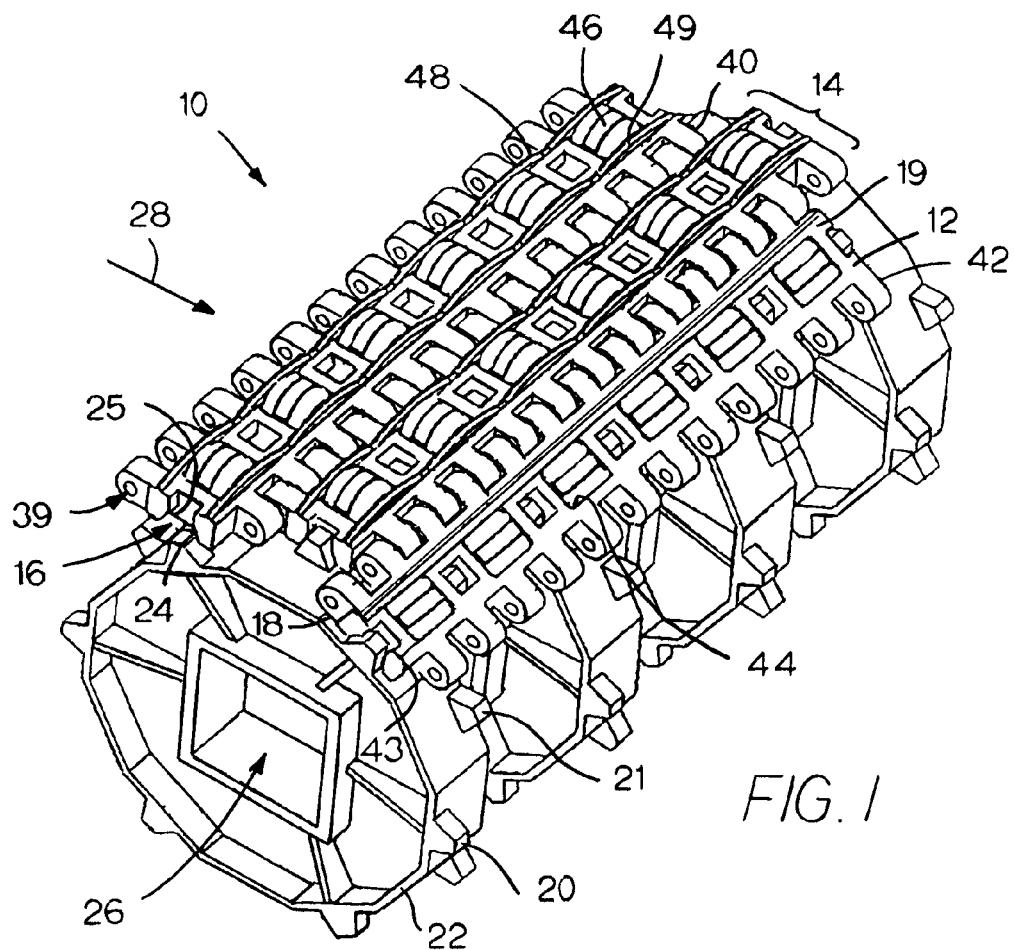
FIG. 1 is an isometric view of a portion of a modular plastic conveyor belt embodying features of the invention.

A portion of a conveyor belt embodying features of the invention is shown in FIG. 1. The portion of the modular conveyor belt 10 shown is an interior portion. Three conveyor belt modules 12 are connected together in three belt rows 14. The modules are shown offset laterally from row to row in a bricklay pattern. Although only one module 12 is shown in each row 14, other similar modules are connected side by side in each row to form an endless conveyor belt. Drive pockets 16 opening onto bottom sides 18 of the modules admit teeth 20, 21 of drive or idle sprockets 22. The teeth 20, 21 of drive sprockets drive against leading drive surfaces 24 bounding the pockets. The teeth 20, 21 of idle sprockets are driven by trailing drive surfaces 25 bounding the pockets opposite the leading drive surfaces. The teeth are arranged in two groups around the periphery of each of the sprockets. Each group is laterally offset from the other across the width of the sprocket. The teeth 20 in a first group are staggered circumferentially from the teeth 21 in a second group, with the teeth in each group spaced at twice the pitch of the conveyor belt. In this way, the teeth are positioned to engage the drive pockets 16, which are laterally offset from row to row. The teeth 20 in the first group engage all the even rows, and the teeth 21 in the second group engage all the odd rows. The endless belt is trained around idle and drive sprocket sets, which are mounted on shafts (not shown) received in bores 26 of the sprockets. The shaft of the drive sprockets is rotated by a motor and gear box (not shown) to drive the belt in a direction of travel 28.

Figure 2:
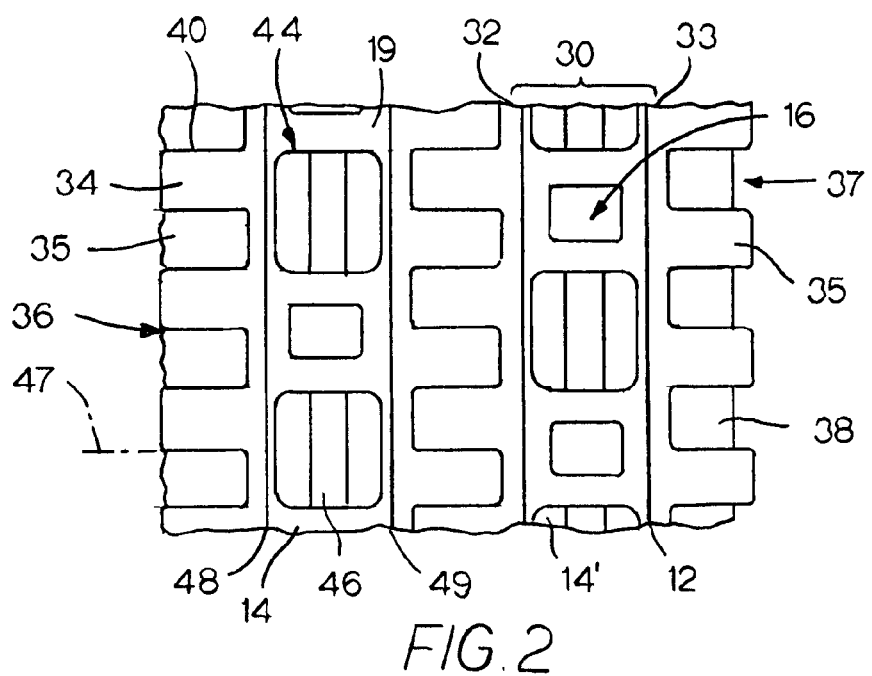
FIG. 2 is a top plan view of a portion of the conveyor belt of FIG. 1.

As shown in FIG. 2, each module 12 has an intermediate portion 30 that extends from a first end 32 to an opposite second end 33 defining the length of the module. The module extends in width from a first side edge 42 to an opposite second side edge 43. The thickness of the module is measured from the bottom side 18 to an opposite top side 19. Hinge elements of a first set 34 are spaced apart laterally along the first end 32, and hinge elements of a second set 35 are spaced apart laterally along the second end 33. First and second gaps 36, 37 between the hinge elements of the first and second sets 34, 35 are sized to allow the first set of hinge elements of one row to interleave with the second set of hinge elements of an adjacent row. Hinge pins 38 through aligned openings 39 in the interleaved hinge elements connect adjacent rows together at hinge joints 40 in the endless belt 10.

Each belt module 12 has one or more cavities 44 that open onto the top side 19 of the module. The illustrative cavities 44 are formed in the middle of the intermediate portion 30 of the module 12. Alternatively, a cavity 44 may comprise an opening or concave portion formed in a side edge or other location on the intermediate portion, which forms a portion of a bounded cavity when two modules are placed side by side. In the version of the module shown in FIG. 2, the cavities also open onto the bottom side 18 and are alternately positioned across the width of the intermediate portion with the drive pockets 16, which are shown opening onto the top side 19, too. Alternatively, the cavities may open onto only top side 19 or the bottom side 18 of the module. A belt roller 46 is mounted in each cavity for rotation on an axis 47, which as illustrated is parallel to the length of the intermediate portion, though the axis 47 can have any suitable orientation. The rollers 46 on one row 14 are shown offset in the width direction from those in an adjacent row 14' for more even article support. The lateral offset from row to row means that the drive pockets 16 are also laterally offset from row to row. The laterally offset and circumferentially staggered groups of teeth 20, 21 on the sprockets accommodate the offset roller arrangement. Salient portions of the rollers 46 extend above the top side 19 of the belt into a supporting position for conveyed articles.

First and second parallel ridges 48, 49 extend laterally across the width of the module along the first and second ends 32, 33. The ridges increase the module's beam stiffness. The ridges shown are wavy, their height above the top side varying across the width of the module. The height of the ridges is at a maximum at the position of the roller cavities 44. But the peak of the ridges is below the tops of the rollers. The height of the ridges decreases to a minimum midway between cavity positions in the module. In this way, the bottoms of conveyed articles are guaranteed to ride atop the rollers, and trip points on the ridges are minimized.

Figure 3:
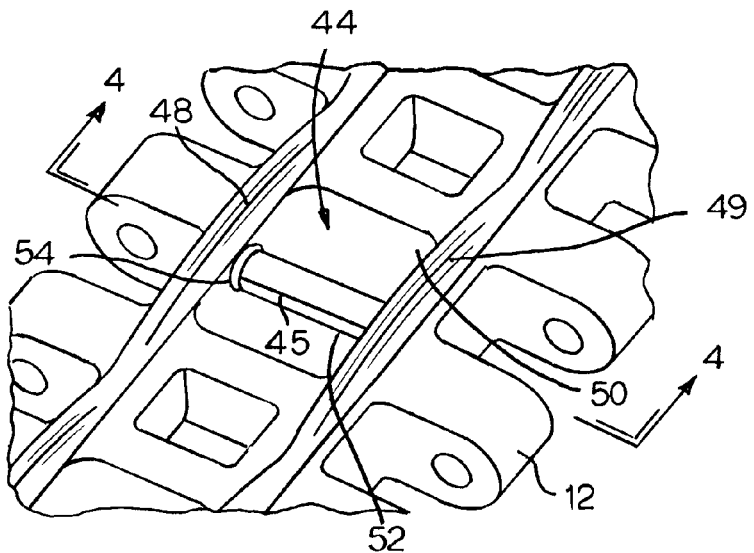
FIG. 3 is an enlarged isometric view of the top surface of a module of a conveyor belt as in FIG. 1.

A portion of the belt module 12 without a roller is shown in FIG. 3. The roller cavity 44 in the intermediate portion 30 is bounded by a perimetric wall 50, though alternatively, the roller cavity 44 may be formed in a side edge or other location of the intermediate portion 50. An axle 52 for the rollers extends across the cavity. In the embodiment of FIG. 3, the axle 52 extends diametrically across the cavity, with the ends 54 of the axle terminating at opposite positions on the wall 50, though the axle 52 may alternatively extend across only a portion of the cavity 44. Alternatively, the cavity 44 may include one or more axle nubs connected to the wall 50, or axle recesses for receiving axle ends connected to a roller.

Figure 4:
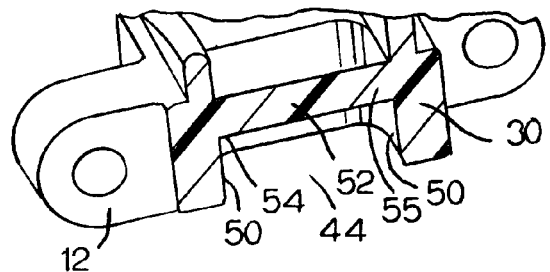
FIG. 4 is an axonometric cross section of the module of FIG. 3 taken along lines 4-4.

Preferably, the axle 52 is fixed relative to the intermediate portion 30. As shown in cross section in FIG. 4, the axle 52 is formed unitarily with the intermediate portion 30 of the module 12, its ends 54, 55 continuous with the wall 50 and the rest of the module. Alternatively, the intermediate portion 30 of the module 12 may be molded around one both ends 54 or 55 of the axle to fix the axle in the cavity. Or, the axle may snap into receptacles in the belt module. In this example, the axle's axis (47, FIG. 2) is parallel to the length of the intermediate portion 30 so that the roller rotates transverse to the direction of travel. But the axle 52 could be formed in the cavity at other angles, such as with its axis of rotation parallel to width of the intermediate portion to rotate in or opposite to the direction of travel, or with its axis of rotation oblique to the direction of belt travel.

Figure 10:
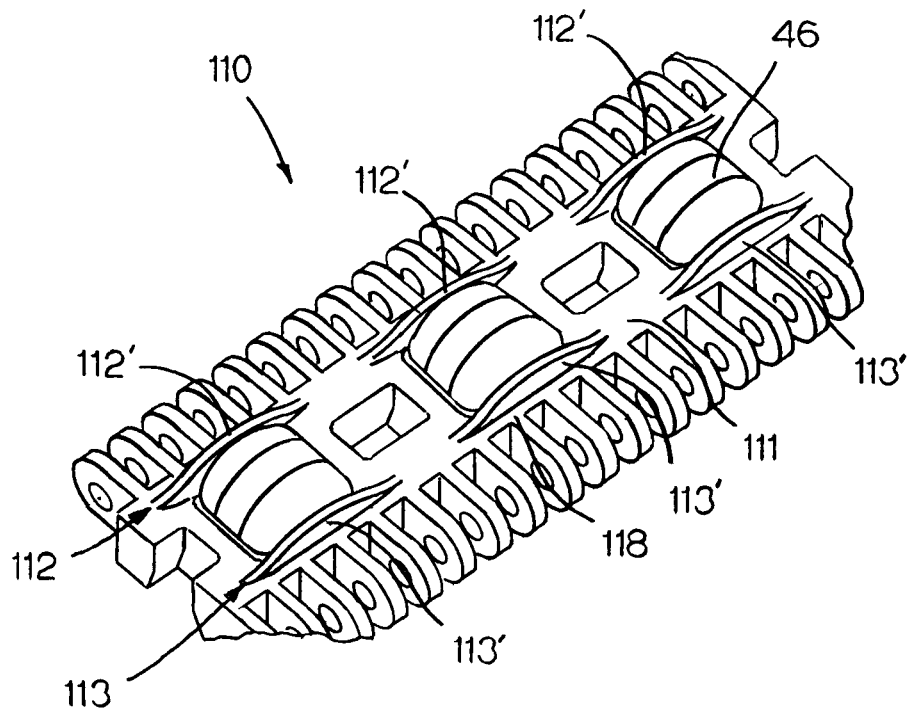
FIG. 10 is an isometric view from the top side of a portion of another version of conveyor belt module usable to make a conveyor belt as in FIG. 1.
Figure 11:
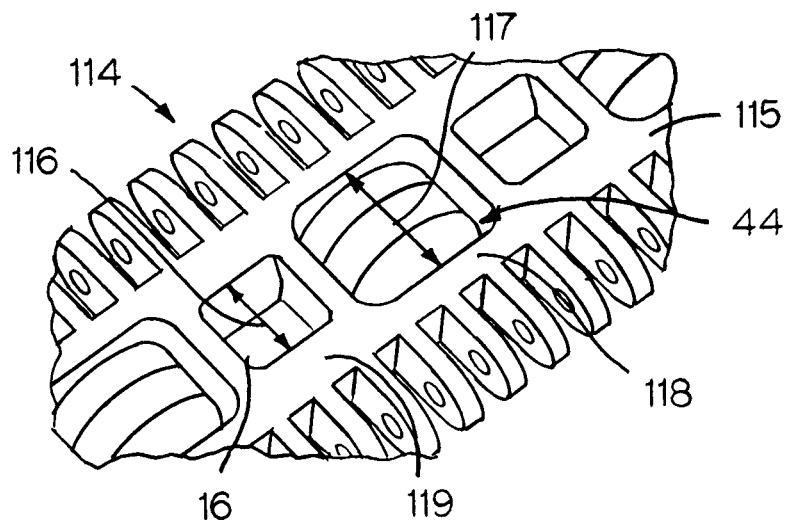
FIG. 11 is an isometric view of a portion of the bottom side of the conveyor belt module of FIG. 9.

Another version of a conveyor belt module that can be used to construct stiff roller-top belts is shown in FIGS. 10 and 11 from the top and bottom sides. The conveyor belt module 110, which is similar to the belt module 12 of FIG. 3, has on its top side 111 first and second ridges 112, 113 that are segmented across the width of the intermediate portion of the module into individual ridge segments 112', 113' whose maximum heights coincide with the positions of the rollers 46. As seen from the bottom side 115 of the module in FIG. 11, the length dimension 116 of the drive pockets 16 is less than the length dimension 117 of the roller cavities 44, which means that the beam portions 118 between the hinge elements and the cavities are thinner than the beam portions 119 between the hinge elements and the drive pockets 16. The ridge segments 112', 113' on the top side of the thinner beam portions 118 add stiffness to those thinner portions.

Figure 9:
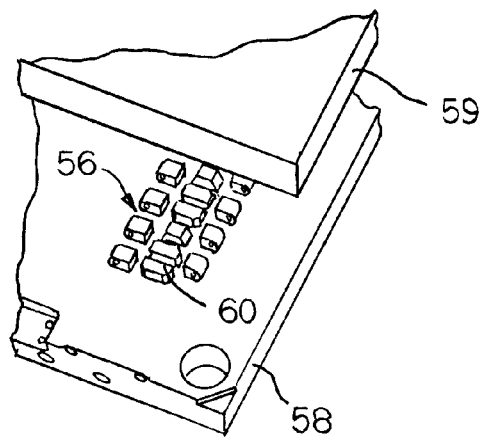
FIG. 9 is an isometric view of a mold for a conveyor belt module as in FIG. 3.

One way of manufacturing the module is shown in FIG. 9. A molten thermoplastic polymer, such as polypropylene, polyethylene, acetyl, or a composite polymer, is injected into a cavity region 56 of a closed mold consisting of two mold halves 58, 59 (shown separated). (The axle and cavity portion 60 of one half of the mold is shown in FIG. 9.) Once the mold cavity is filled, heat and pressure are applied to the joined mold halves to mold the module. The mold halves are parted and the molded module ejected. In this way, the axle may be molded unitarily with the intermediate portion of the module.

Because the axles 52 are fixed relative to the modules and both ends 54, 55 of the axles are connected to the walls 50, the belt rollers 46 cannot be axially inserted onto the axles. Therefore, a snap-on roller may be used, various embodiments of which are described below. In some embodiments, a snap-on multi-piece roller may comprise two or more separate pieces that join together to form a complete roller. For example, as shown in FIGS. 5A and 5B, a complete roller 146 includes a first roller section 162 and a second roller section 163 that are joined along a joint 148. The complete roller has a first axial face 151 at a first end, a second axial face 152 at a second end and an outer peripheral surface 153 that is substantially cylindrical. A bore 164 extends from the first axial face 151 to the second axial face 152 along a longitudinal axis 166 to accommodate an axle. The multiple roller sections 162, 163 wrap around the axle and join together using a snap fit, bonding, mechanical means or other suitable means to form the complete roller.

Preferably, each roller section 162, 163 includes at least one retaining mechanism, illustrated as fingers 167 extending from a base member 178, for retaining the two roller sections 162, 163 together. Each finger 167 is configured to engage a feature, illustrated as recesses 169, on the mating roller section to facilitate assembly of the complete roller 146.

In the embodiment of FIGS. 5A and 5B, each roller section 162, 163 includes a longitudinally extending channel 168 that defines a portion of the bore 164. According to one feature of the invention, the channels 168 may be torsioned to reduce noise and ensure smooth rolling action of the complete roller 146. As shown, the side edges 172, 173 of the channel 168 extend at an angle (i.e., non-parallel) relative to the longitudinal axis 166 of the channel 168. Preferably, the side edges 172, 173 skew in opposite directions. The resulting interior joints 148*a* within the bore 164 are angled relative to the longitudinal axis 166. The interior joint 148*a* may be parallel to an outside joint 148*b* on the peripheral surface, or may be skewed or otherwise differently configured from the outside joint 148*b*, so as to not catch on a raised molded parting line 45 (FIG. 3) that may extend along the outside of the axle 52 on opposite sides.

In one embodiment, at least one roller section is rotationally symmetric about a radial axis 176 extending through the middle of the roller section perpendicular to the longitudinal axis 166 to facilitate manufacture and assembly of the complete roller 146. In the illustrative embodiment, the roller section 163 has a rotational symmetry on the order of two, so that the roller section 163 is reversible about the central radial axis 176. In this manner, each roller section 162 and 163 can be rotated 180° and still have the same configuration.

As also shown in FIGS. 5A and 5B, the ends 174, 175 of each channel 168 may be chamfered, such that the ends of the resulting bore 164 flare away from the axis, reducing contact with an axle inserted in the bore and reducing the chance of roller seizure. The flared bore ends may accommodate a flared axle end 54 and-or facilitate a transition between the wall 50 and the axle 52, resulting in enhanced safety for the resulting conveyor belt.

In addition, the axial faces 151, 152 of the complete roller 146 may be chamfered toward the radially outer portion of the axial faces 151, 152. The roller end chamfer allows for minimal roller-cavity clearance, while allowing the roller sections to deflect during joining without contacting the side walls of the module.

Figures 6A, 6B, 6C:
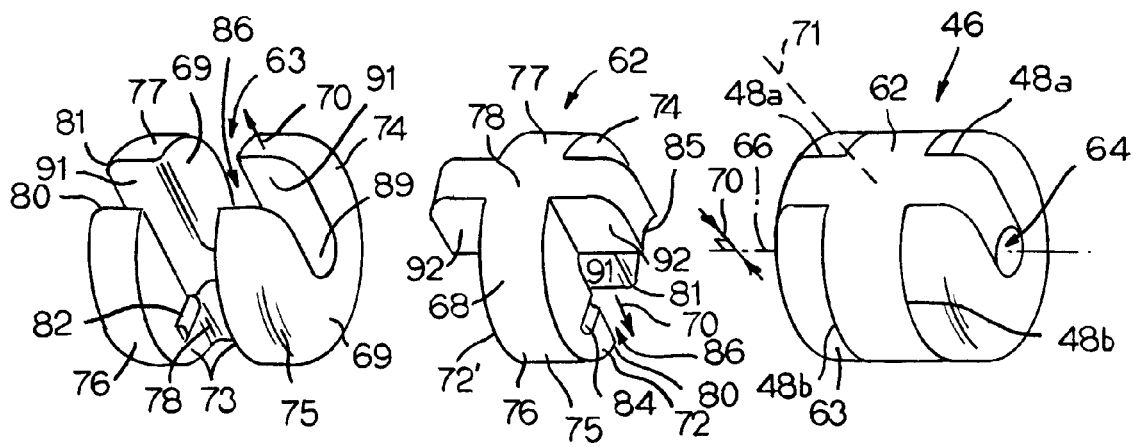
FIGS. 6A-6C are oblique views of first and second roller pieces and a complete roller usable in a conveyor belt module as in FIG. 3.

FIGS. 6A-6C show another version of a multi-piece roller 46. The roller consists of two different pieces: a first roller section 62 and a second roller section 63. The two sections are inserted radially onto the axle and joined together like three-dimensional puzzle pieces. When joined, the two roller sections form the complete roller 46 with a central bore 64 along a central axis 66 of the roller. The first roller section 62 has a first interdigitating member 68 that interdigitates with a pair of second interdigitating members 69 on the second roller section 63 to form the complete roller 46. The complete roller is assembled by sliding the two roller sections 62, 63 together in a radial direction 70 perpendicular to the central axis 66. In the embodiment of FIGS. 6A-6C, both of the roller sections 62 and 63 are rotationally symmetric about a central axis 71 that bisects each roller section and extends perpendicular to the longitudinal axis 66. In this manner, each roller section 62 and 63 can be rotated 180° and still have the same configuration.

Each of the interdigitating members 68, 69 has a lateral face 72 in contact with a lateral face 73 of an adjacent interdigitated member. In this example, the axially-outward facing lateral faces 72, 72' of the first roller section 62 contact the axially-inward-facing lateral faces 73 of the second roller section 63. The axially overlapped faces prevent axial separation of the two interdigitated roller sections.

Each of the interdigitating members 68, 69 has a pair of fingers 74, 75 on opposite sides of the bore 64. Each finger 74, 75 forms a portion 76, 77 of the outer periphery of the complete roller 46. The fingers extend from a base member, illustrated as cap member 78, out to distal ends 80, 81. Like the fingers, the cap members form a portion of the periphery of the complete roller. A radially inner face 91 of each finger engages a radially outer face 92 of the cap member 78 to prevent separation of the roller sections. In the illustrative embodiment, the radially inner face 91 of each finger extends substantially parallel to the radial direction 70 and perpendicular to the central axis 66 of the bore 64 to the distal ends 80, 81. The interface between the distal ends 80, 81 of the fingers of each roller section and the cap member 78 of the mating roller section form a finger-cap member joint 48a on the outer periphery of the complete roller 46. The illustrative finger-cap member joint 48a is parallel to the longitudinal axis 66. The finger-finger portions 48b of the joint between the two roller sections 62, 63 extend perpendicular to the longitudinal axis 66.

The interdigitated roller sections may be retained together through any suitable means. In one embodiment, the interdigitated roller sections are retained together by locking means in the form of locking ears 82 formed on the lateral faces 73 of the second roller section 63 in cooperation with matching detents 84 formed in the lateral faces 72, 72' of the first roller section 62. The ears snap in place in the detents to lock the roller on the axle and prevent it from radially separating in operation. The first and second roller sections 62, 63 surround less than 360° of the bore and form a gap 86 opening into the bore that is wide enough to admit an axle radially into the bore. In this example, the interdigitating members surround about 180° of the bore.

The channels 85, 89 on the roller sections 62, 63, which define a portion of the bore 64, may be torsioned to facilitate noise reduction and promote smooth rolling of the complete roller 46. In addition, the ends of the channels forming the bore 64 may be chamfered to allow the bore to have a widened diameter at the axial ends of the roller.

Figure 7A:
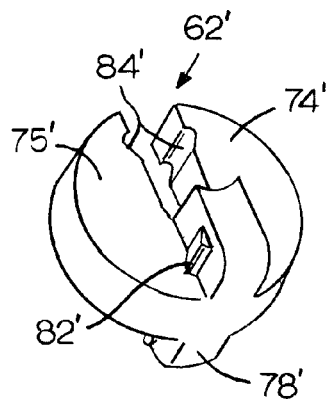
FIGS. 7A-7C are axonometric views of a first roller piece, a second roller piece, and another complete roller usable in a conveyor belt module as in FIG. 3.
Figure 7B:
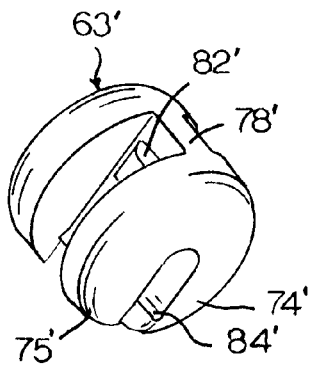
Figure 7C:
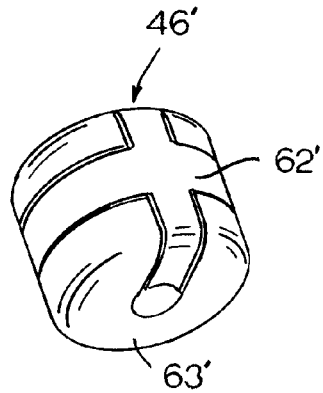

Another version of a multi-piece belt roller is shown in FIGS. 7A-7C. The complete roller 46' is externally identical to the roller 46 of FIG. 6C. The only difference is the locking means in which locking ears 82' are formed on the cap members 78' of the first and second roller sections 62', 63' and mating detents 84' are formed in the fingers 74', 75'.

Figure 8A:
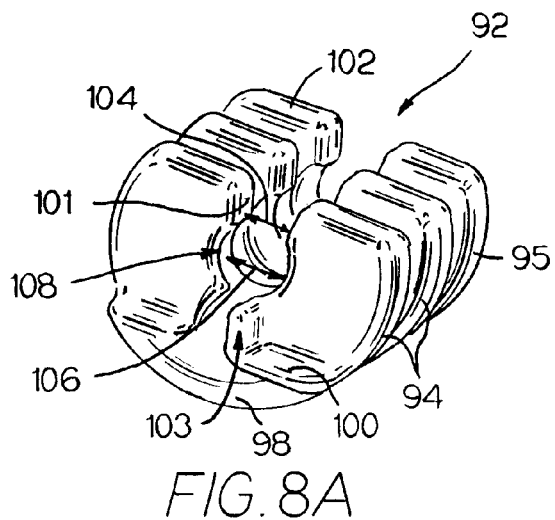
FIGS. 8A and 8B are axonometric views of a roller piece and another complete roller usable in a conveyor belt module as in FIG. 3.
Figure 8B:
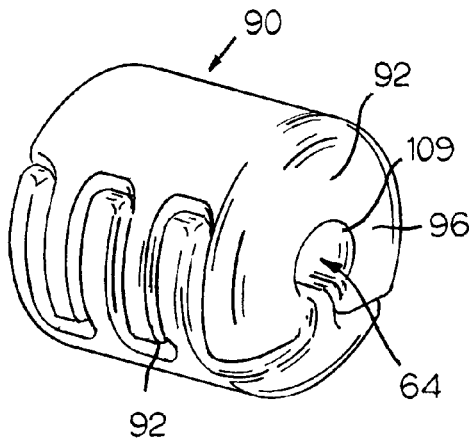

Yet another version of a multi-piece roller that is usable in a conveyor belt as in FIG. 1 is shown in FIGS. 8A and 8B. In this version, the complete roller 90 consists of two identical roller sections 92. Each roller section in this example has three interdigitating members: two internal members 94 and an end member 95. The interdigitating members are identical except that the end member 95 has a rounded outer face 96 that forms an axial face of the complete roller 90. Like the rollers of FIGS. 6A-6C and 7A-7C, the roller 90 has a base member, illustrated as a cap portion 98, that forms a portion of the outer periphery of the roller across its entire axial length. The interdigitating members 94, 95 extend from a flat base 100 of the cap member 98 to flat distal ends 102. When the complete roller is assembled as in FIG. 8B, the distal ends of the interdigitating members rest on the flat base of the cap member of the other roller section. Radially inner surfaces 101 of the interdigitating members extend substantially perpendicular to the axis of the bore 64 and engage radially outward facing surfaces 103 of the cap member 98 to facilitate coupling of the roller sections 92, 92. Because the cap members are opposite each other, they help prevent impulse or shock loads from separating the roller sections.

The interdigitating members 94, 95 of each roller section 92 in this roller surround more than 180° of the bore 64. Unlike the rollers of FIGS. 6A-C and 7A-C, the roller 90 has gaps 104 leading into the bore 64 that, at their narrowest, are narrower than the bore's diameter 106. The restricted opening into the bore portion 108 allows each roller section to snap onto an axle whose diameter is slightly greater than the width of the gaps 104. The bore portions 108 include a chamfer 109 at the ends near the outer face 96 to allow the bore 64 to have a widened diameter at the axial ends of the roller 90.

FIGS. 12A-12G illustrate a multi-piece roller for a conveyor belt according to another embodiment of the invention. In the embodiment of FIGS. 12A-12G, the multi-piece roller 246 comprises two roller sections 249 that join along a joint 248 to form the complete roller 246, as shown in FIG. 12A. The resulting roller has a first axial face 251 at a first end, a second axial face 252 at a second end and a peripheral surface 253 that is substantially cylindrical. A bore 264 extends from the first axial face 251 to the second axial face 252 along a longitudinal axis 266 to accommodate an axle of the belt module. The multiple roller sections wrap around the axle and join together using a snap fit, bonding, mechanical means or other suitable means to form the complete roller. In the embodiment of FIG. 12A, the complete roller 246 comprises two identical roller sections 249 that mate to form the complete roller 246.

FIGS. 12B-12G illustrate the roller section 249 in detail. Each roller section 249 is preferably rotationally symmetric about a central radial axis 270 and comprises two identical halves 249a, 249b (shown in FIG. 12F) having offset, diametrically opposed fingers 271, 272 extending from a base member 260, resulting in a rotational symmetry on the order of two. The fingers 271, 272 of the first roller section 249 interlock with fingers 271, 272 of a corresponding roller section to prevent axial and/or radial separation of the roller sections.

Each roller section includes a channel 261 formed in the base member 260 defining a portion of the bore 264 when the roller sections are joined. In the illustrative embodiment, the channel 261 is torsioned to reduce noise and ensure smooth rolling action of the complete roller 246. The side edges 262, 263 of the channel 261 extend at an angle (i.e., non-parallel)

relative to the longitudinal axis 266 of the channel 261. As shown, the edge 262 of the channel 261 is farther from the base member 260 at a first axial end 251 and slopes downward toward the second end 252. Conversely, the edge 263 is closer to the base member 260 at the first axial end 251 and slopes upward toward the second axial end 252. The resulting joints 248a within the bore 264 are skewed or twisted relative to the longitudinal axis 266.

As shown in FIGS. 12A, 12C, 12E and 12G, the ends 265 of the channel 261 may be chamfered such that the ends of the resulting bore 264 flare away from the axis 266, reducing contact between an axle inserted in the bore and reducing the chance of roller seizure.

Each finger 271, 272 may be formed at diametrically opposite ends of the base member 260 and channel 261, and the fingers are preferably identical to each other, creating the rotational symmetry. Each finger 271 includes a radially outer surface 273 that forms a portion of the periphery 253 of the completed roller. An axially outer surface 274 forms a portion of an axial end face 251 or 252 of the completed roller. Each finger 271, 272 further includes a contoured axially inner surface 275 configured to engage an axially inner surface 275 of a mating roller section finger. A contoured radially inner surface 276 extends from the channel edge 262 or 263 toward a tip 277 and is preferably non-parallel with the radially outer surface 273. The radially inner surface 276 of the finger engages a radially outer surface 254 of the base member 260 when the complete roller is assembled.

FIG. 13 illustrates in detail the axially inner surface 275 of a finger of a roller section 249 according to an illustrative embodiment of the invention. The illustrative axially inner surface 275 is also rotationally symmetric about a central axis 279 (perpendicular to the page, as shown by the X) to facilitate a snap-fit connection between the fingers 271, 272 and prevent separation of the roller sections once joined. The order of the rotational symmetry of the illustrative surface 275 is two, such that the upper half of the axially inner surface 275, when rotated 180° about the axis 279, matches the lower half of the axially inner surface. The axially inner surface 275 includes a central flat surface 275a that may be perpendicular to the longitudinal axis 266. Camming surfaces 275b, 275c extend from the central surface 275a and extend at a slant relative to the longitudinal and radial axes 266, 270. A top, curved segment 275d forms a tip portion 277 of the finger 271. The top, curved segment 275d intersects an axially extending flat surface 275e to form a projection 281 while the intersection between the axially extending flat surface 275e and the camming surface 275b forms a groove 282. A lower curved surface 275f and a lower axially extending surface 275g intersect to form a groove 283 that is complementary to the protrusion 281. The lower camming surface 275c and lower axial surface 275g intersect to form a protrusion 284 that is complementary to the groove 282. When the two roller sections 249 are snap-fitted together, the top curved segment 275d of each finger slides over the lower camming surface 275c of the opposing finger and into engagement with the lower curved segment 275f. Upper axial surfaces 275e abut lower axial surfaces 275g, upper camming surfaces 275b abut lower camming surfaces 275c and central flat surfaces 275a abut each other. The corresponding notches 282, 283 and protrusions 281, 284 prevent separation of the roller sections once locked into place. The resulting outer peripheral joint 248b between the roller sections is jagged and includes axially extending sections, a radially extending section, and slanted sections.

FIG. 14 illustrates the radially inner surface 276 of a finger of a roller section 249 according to an illustrative embodiment of the invention. As shown, the radially inner surface 276 and-or the complementary radially outer surface 254 of the cap member may be notched or otherwise configured to facilitate interlocking of the two roller sections. As shown, the finger radially inner surface 276 includes a notch 285 and a protrusion 286 that are parallel to and intersect the notch 282 and protrusion 281 on the axially inner surface 275. A curved upper surface 276a extends from the tip 277 and intersects a flat surface 276b to form the protrusion 286. A camming surface 276c extends between the channel 261 and the flat surface 276b.

The radially outer surface 254 of the cap member includes a corresponding camming surface 254c, flat segment 254b, and curved segment 254a. A notch 287 formed between surfaces 254b and 254a receives the protrusion 286 of the finger, while a protrusion 288 fits into the notch 285 of the finger to secure the roller sections together. The illustrative configuration creates a jagged joint 248c in the axial face 251 or 252 of the completed roller. The curved segment 254a of the outer surface 254 of the cap member accommodates the rounded tip 277 of the finger to ensure a smooth, cylindrical outer surface 253 of the completed roller and forms an axially extending joint portion 248e, shown in FIG. 12A, extending from the axial end of the roller on the outer periphery where a tip of a finger abuts a cap member. In addition, the rounded tip of the finger reduces the likelihood of snags during assembly and operation.

When the complete roller 246 is assembled as in FIG. 12A, the distal ends 277 of the fingers 271, 272 rest on a surface of the base member 260 of the other roller section. Because the base members are opposite each other, they help prevent impulse or shock loads from separating the roller sections.

The offset fingers 271, 272 and bidirectional snap features of the illustrative roller 246 described previously allow the roller to snap on a diagonal, ensure a robust and secure connection, constrain sliding and twisting, and simplify the mold design for forming the roller sections 249.

In addition, as shown in FIGS. 12D and 12F, the axial surfaces 274 forming the axial ends of the roller may be chamfered toward the radially outer end portion 274a of the axial face. The end chamfer allows for minimal clearance between a roller cavity and the roller, while allowing the roller section to deflect during joining of the two roller sections without contacting the sidewalls of the cavity. The end chamfer limits points of contact between the roller 246 and the belt module to reduce friction and ensure smooth operation of the roller.

The roller 246 may be cored, with openings 298 extending from the first axial face 251 to the second axial face 252. The openings 298 reduce the weight of the roller and enhance rotation of the roller during operation of the conveyor belt.

FIG. 15A illustrates a multi-piece roller 346 according to another embodiment of the invention. As shown, the multi-piece roller 346 includes two roller sections 349 configured to snap-fit together to create a complete roller. The roller sections 349 of FIG. 15A are identical. As shown in FIG. 15B, each roller section 349 includes a base member 360 having a channel 361 defining a portion of the bore of the complete roller and extending along an axis of rotation 366. The channel 361 may be torsioned and-or chamfered at the ends, similar to the embodiments previously described. Each roller section 349 includes three fingers extending from the base member 360: two axially outer fingers 371, 372 extending from a first side of the channel 361 and a middle finger 373 extending from a second side of the channel 361. The space between the two axially outer fingers 371, 372 forms an opening 381 for receiving the middle finger 373 of a mating roller section. The middle finger 373 is preferably the same shape as the opening 381.

In the embodiment of FIGS. 15A and 15B, the middle finger is barbed to facilitate a snap-fit connection and is symmetric about a radial axis 370. In the illustrative embodiment, the axially outward facing surfaces 375 of the middle finger 373 are rotationally symmetric to facilitate interlocking of the two roller sections. The axially inner facing surfaces of the fingers 371, 372 are also rotationally symmetric and complementary to the surfaces 375. The middle finger 373 includes flat base surfaces 384a, 384b extending from the base member 360. The base surfaces 384a, 384b may be perpendicular to the longitudinal axis 366 of the channel 361. Axially extending flat surfaces 385a, 385b intersect the base surfaces 384a, 384b to form opposing grooves for receiving ears 391, 392 on outer fingers of a mating roller section. Tapering surfaces 386a, 386b extend from the axially extending flat surfaces 385a, 385b and terminate in flat surfaces 387a, 387b, which form a straight middle section of the middle finger 373. Tapering surfaces 388a, 388b extend from the middle flat surfaces 387a, 387b to further narrow the middle finger width. The middle finger 373 terminates in a rectangular tip 389 that is received in a rectangular groove 393 formed at the base between the outer fingers 371, 372. Radially inner surfaces on the distal ends of the fingers engage radially outer surfaces 367 of the base member and the flat tops 369 of the fingers 371, 372, 373 engage flat surfaces 368 on the base member 360 when the multi-piece roller 346 is assembled.

Figure 16A:
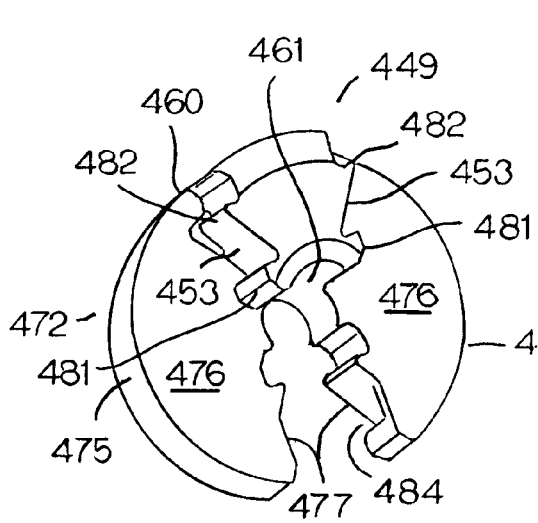
FIG. 16A-B illustrates roller sections for a multi-piece roller according to another embodiment of the invention.
Figure 16B:
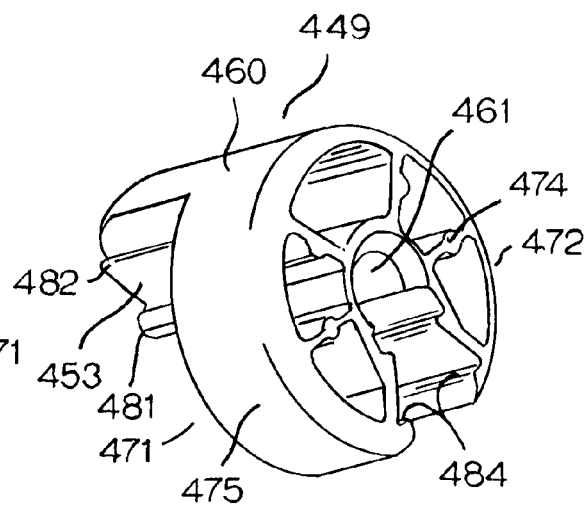
Figure 16C:
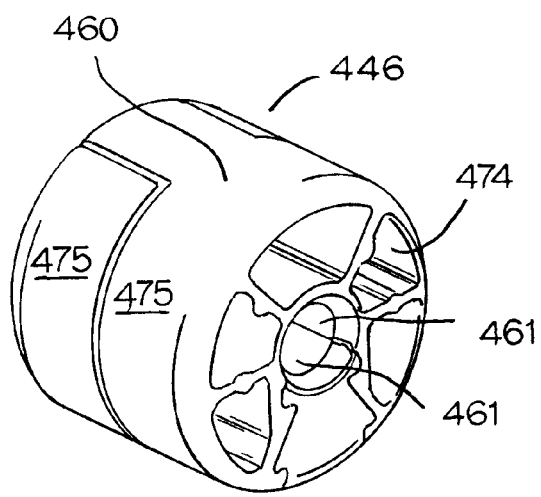
FIG. 16C illustrates a multi-piece roller comprised of the roller sections shown in FIGS. 16A-B.

FIGS. 16A and 16B illustrates rollers sections for a multi-piece roller 446, shown in FIG. 16C according to another embodiment of the invention. As shown, the multi-piece roller 446 includes two identical roller sections 449 configured to snap-fit together to create a complete roller. Each roller section 449 includes a base member 460 including an axially extending channel 461, which may be torsioned and-or chamfered. Axially aligned, opposing fingers 471, 472 extend from the base member and are located at a first axial end of the channel 461. The axially outer surfaces 474 of the fingers form at least a portion of an axial face of the completed roller. Radially outer surfaces 475 of the fingers 471, 472 define at least a portion of the outer periphery of a completed roller. Axially inner surfaces 476 of the fingers are configured to engage the axially inner surfaces 476 of the fingers formed on the mating roller section. The radially inner surfaces 477 of the fingers form a space configured to receive the opposite axial end of the base member 460 of the corresponding roller section and to define an axial end of the bore formed by the channels 461. The radially outer surfaces 453 of the base member 460 are configured to engage the radially inner surfaces 477 of the fingers. Ears 481, 482 snap into recesses 483, 484, respectively, to form the completed roller 446. An axial slide lock feature (not shown) may be used to limit axial movement of the roller sections relative to each other when assembled.

FIG. 17 illustrates still another embodiment of a multi-piece roller 546, comprising identical roller sections joined together. In the embodiment of FIG. 17, each roller section 549 comprises four interdigitating fingers extending from a base member 560. The base member 560 also includes a longitudinally extending channel 561 forming a portion of the bore of the complete roller 546. The channel 561 may be torsioned and-or chamfered as previously described. The interdigitating fingers comprise two outer fingers 571 formed on an axial end of the base member 560 on either side of the channel 561 and inner fingers 572 formed on an axially inner portion of the base member 560 on either side of the channel 561. The axially outer surfaces 574 of the outer fingers 571 form axial end faces of the complete roller 546. Radially outer surfaces 573 of the fingers 571 and 572 form a portion of the outer peripheral surface of the complete roller 546.

The complete roller 546 is assembled by sliding the two roller sections 549 together in a radial direction 570 perpendicular to the central axis 566. The inner fingers 572 fit into a space 581 formed between the outer fingers and inner fingers of the opposing roller section, and the outer fingers 571 fit on the axially outer ends of the inner fingers of the opposing roller section. A radially outward facing surface 586 of the base member 560 engages radially inward facing surfaces 526 of the outer and inner fingers 571, 572. As shown, the axially inner surfaces 575 of the outer fingers are complementary in shape to the axially outer faces 578 of the inner fingers 572. The axially inner faces 577 of the inner fingers, which are rotationally symmetric, are configured to engage each other. The contoured surfaces of the fingers 571, 572 include notches, camming surfaces, tapered surfaces, and-or protrusions configured to ensure a secure connection between the two roller sections.

Other locking means for locking the two roller sections together include adhesive-bonding, sonic welding, and other conventional mechanical and chemical fastening techniques. Furthermore, each of the roller sections could be molded out of more than one material to provide desirable operating characteristics and a variety of outer periphery textures.

FIGS. 18A-18D illustrate a roller section 845 used to form a two-piece roller 846, shown in FIG. 18E, including integral axle nubs 869 according to another embodiment of the invention. The two-piece roller comprises identical roller halves 845 configured to snap together to form a complete roller. Each roller half 845 includes a base member 878 having a rounded bottom surface 854, a first axial end face 851, a second axial end face 852, and a joint surface 853. An axle nub 869 extends from the first axial end face 851 along the roller longitudinal axis 877. A plurality of fingers 867 extend from the joint surface 853 at the first axial end, and a plurality of complementary recesses 868 are formed in the joint surface at the second axial end. The illustrative recesses 868 extend to the first axial end of the roller half, but alternatively, the recesses may be limited in length.

Preferably, the joint surface 853 is angled relative to the longitudinal axis 877 of the roller to facilitate insertion of each roller half 845 into a cavity of a conveyor belt module. The associated conveyor belt module includes axle recesses in the cavity wall for receiving the axle nubs 869 and allowing the complete roller to rotate about the axis 877 within the cavity. The first axial end face 851 is therefore larger than the second axial end face 852. A conveyor belt module employing the roller is assembled by inserting a first roller half 845 into the cavity, such that the axle nub 869 enters the axle recesses, then the second roller half 845 snaps onto the first roller half, such that the axle nub 869 of the second roller half enters an axle recess in a second wall of the module cavity. The recesses 868 of the first roller half receive the fingers 867 of the second roller half, and the recesses 868 of the second roller half receive the fingers 867 of the first roller half. The resulting joint 890 on the outer peripheral surface of the roller 846 is angled relative to the axis 877, which may facilitate rotation of the complete roller about the axis 877 relative to the conveyor belt module.

The fingers 867 and corresponding recesses 868 may have any suitable configuration to facilitate a snap-fit connection between roller halves 845. The illustrative fingers 867 include a tapered top portion and groove for engaging a protrusion in the recess 868. The recesses 868 are open to the axial end face 852. When the roller halves mate, the axial end surfaces of the fingers 867 are flush with the axial end surface 852 of the complementary roller half.

As shown, the axle nubs 869 may be tapered to facilitate assembly and operation of the complete roller. The illustrative axle nubs 869 are frustoconical in shape, though the nubs may alternatively have any suitable configuration.

Another embodiment of a two-piece roller 946 is shown in FIG. 19. The two-piece roller 946 includes a first roller half 947 comprising a semi-cylindrical base 978 and axle nubs 969 formed on each axial end of the base 978 along axis 977. Flexible axle tabs 951 connect the axle nubs to the base 978. The second roller half 948 comprises a base 979, axial end faces 952 having slots 959 for receiving the axle nubs 969, and an axially extending support rib 971. The two-piece roller 946 may be mounted in a cavity of a conveyor belt module having axle recesses designed to receive the axle nubs 969. The two-piece roller 946 is rotatably mounted in a cavity of a conveyor belt module by depressing the axle nubs 969 mounted on the flexible tabs 951, inserting the roller 946 into the cavity and releasing the tabs to allow the nubs to spring back into the axle recesses. The axle nubs 969 may be tapered. The roller halves 947, 948 may be joined together using any suitable means, such as a snap-fit, mechanical connection, adhesive-bonding, sonic welding, and other conventional mechanical and chemical fastening techniques.

According to another embodiment, a snap-on roller may comprise a single piece including one or more axle nubs. The roller may include a flexible wall to facilitate insertion of the roller into a cavity of a belt module. Alternatively, a belt module may include a flexible wall to receive and lock in the axle nubs. For example, an embodiment of a one-piece snap-on roller 1046 is shown in FIGS. 20A-C. The roller 1046 includes a cylindrical body 1078 including axle nubs 1069 extending along a central roller axis 1077 on each end of the cylindrical body 1078. The axial end faces 1051, 1052 in which the axle nubs 1069 are mounted are flexible to allow deflection of the axle nubs 1069, which may be tapered. In the illustrative embodiment, each axial end face 1051, 1052 includes flexible webbing 1053, 1054 extending radially inward from the cylindrical body 1078 toward the axle nubs 1069. The flexible webbing 1053 forming the axial end face 1051 may be offset from the flexible webbing 1054 forming the axial end face 1052, as shown in the illustrative embodiment. The roller 1046 includes a space 1071 between the axle nubs 1069 in the interior of the roller to allow the axle nubs 1069 to deflect into the interior. The roller 1046 may be rotatably mounted in a cavity of a conveyor belt module by deflecting the axle nubs 1069, inserting the roller 1046 into the cavity, and releasing the axle nubs 1069, causing the axle nubs 1069 to spring back and rotatably lock into the cavity axle recesses.

FIGS. 21A-C illustrate another embodiment of a one-piece snap-on roller 1146 including flexible axle nubs. The one-piece snap-on roller 1146 includes a cylindrical body 1178 and axle nubs 1169 extending from a flexible central wall 1151 along the central axis 1177 of the roller. Alternatively, the axle nubs 1169 may be flexible in the axial direction 1177 to allow deflection of the axle nubs 1169.

In another embodiment, shown in FIGS. 22A-D, a one-piece snap-on roller 1246 includes one axle nub 1269 on a first axial end 1251 of a cylindrical body 1278 and a recess 1268 on a second axial end 1252 of the cylindrical body 1278. Both the axle nub and recess extend along the roller's central axis 1277. The axle nub 1269 is connected to the cylindrical body 1278, which defines the peripheral surface of the roller, by flexible tabs 1253. The flexible tabs 1253 allow the axle nub 1269 to deflect relative to the first axial end 1251. The recess is defined by opposing tabs 1254, which may be flexible, extending radially inward from the cylindrical body 1278. The tabs 1254 terminate in arc-shaped extensions 1255 that cooperate to define the circular recess 1268 along the axis 1277. In the illustrative embodiment, the tabs 1253 are offset from the tabs 1254, though the invention is not so limited. The roller 1246 may be inserted into a conveyor belt module cavity having an axle nub configured to fit into the recess 1268 and an axle recess configured to receive the axle nub 1269.

As shown in FIGS. 23A-E, a one-piece snap-on roller 1346 may include a plurality of flexible, tapered tabs 1353 extending radially inward from a first end 1351 of a cylindrical body 1378 for mounting an axle nub 1369 and a plurality of tapered tabs 1354 extending radially inward from a second end 1352 of the cylindrical body 1378 defining a recess 1368 aligned with the axle nub 1369 along the axis 1377. The tapered tabs 1354 may have cutouts 1355 to increase the flexibility of the tabs 1354. In the illustrative embodiment, the tabs 1353 are offset from the tabs 1354, such that the tabs 1353 align with spaces 1357 between the tabs 1354.

In another embodiment of the invention, a one-piece snap-on roller is designed to snap onto an axle or axle nubs in a cavity of a conveyor belt module. For example, as shown in FIGS. 24A-B a one-piece snap-on roller 1446 may comprise a cylindrical base 1478 defining an outer peripheral surface of the roller and a plurality of ribs 1454 extending radially inward from the base and defining a bore 1464 extending along the roller's central axis 1477. The base 1478 includes an opening, illustrated as an axially-extending slit 1479 between two ribs, through which the axle passes into the bore 1464. After insertion of an axle, the roller may be closed by joining the first side 1481 of the slit 1479 to the second side 1482 of the slit through any suitable means, such as a snap-fit, a mechanical connection, adhesive bonding, or another suitable closure mechanism.

In another embodiment, shown in FIGS. 25A-B, a snap-on roller 1546 includes an axially-extending slit 1579 that is angled relative to the roller's axis of rotation 1577 to facilitate rotation of the roller. In the embodiment of FIGS. 25A-B, a first set of ribs 1554 extends radially inward from the cylindrical base 1578. The ribs 1554 terminate in an axially-extending channel 1565, which connects the ends of the first set of ribs 1554. The channel 1565 defines an axially-extending bore 1564 for receiving an axle. Two separate ribs 1555 adjacent the slit 1579 are configured to allow passage of an axle, so that the axle rests in the channel 1565.

As shown in FIG. 26, in another embodiment of a one-piece snap-on roller 1646, ribs 1655 adjacent a slit 1679 in a cylindrical base 1678 may be curved to facilitate passage of an axle into a channel 1664. Similar to the embodiments of FIGS. 25A-B, a set of ribs 1654 extending axially inward from the cylindrical base 1678 terminates in an axially-extending channel 1665, which connects the ends of the first set of ribs 1654 and defines an axially-extending bore 1664 for receiving an axle.

As shown in FIG. 27, a one-piece snap-on roller 1746 including curved ribs 1755 and radially inwardly extending ribs 1754 defining a channel 1765 may have an angled slit 1779 for receiving an axle.

In another embodiment of the invention, a snap-on roller may comprise a substantially flat substrate having formed thereon a plurality of ribs. The substrate wraps around an axle and the substrate ends couple together to form the roller structure. For example, as shown in FIG. 28, a snap-on roller 1846 may comprise a flexible, flat substrate 1879 having an array of ribs 1850. Each rib 1850 comprises a base 1851, a curved end member 1852, a first side protrusion 1853 connected to the curved end member 1852, and a second side protrusion 1854 spaced from the curved end member to define a groove 1855. To form a rotatable roller, the substrate 1879 is wrapped around an axle, with the first side end 1876 of the substrate joining the second side end 1877 of the substrate to form a cylindrical roller. As the substrate curves, the first side protrusions 1853 of the ribs mate with the grooves 1855, and the curved end members 1852 form a channel for accommodating the axle. The side ends 1876, 1877 of the substrate may include a closure mechanism. For example, the first side end 1876 includes a channel 1891 configured to receive a projection 1892 on the second side end 1877 to join the two ends together and form the roller shape.

Figure 29:
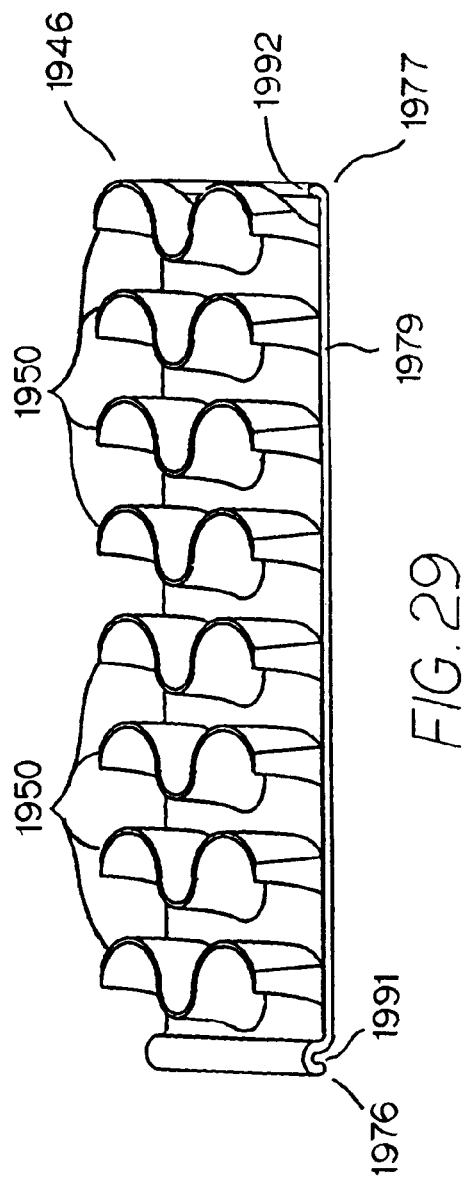
FIG. 29 illustrates another embodiment of a one-piece snap-on roller including a flexible flat substrate and corrugated ribs.

FIG. 29 illustrates another embodiment of a snap-on roller 1946, including a flexible flat substrate 1979, and corrugated ribs 1950. The top surfaces of the ribs 1950 define a bore for receiving an axle when the substrate 1979 is wrapped around the axle. The side ends 1976, 1977 of the substrate may include a closure mechanism. For example, the first side end 1976 includes a channel 1991 configured to receive a projection 1992 on the second side end 1977 to join the two ends together and form the roller shape.

Figure 30:
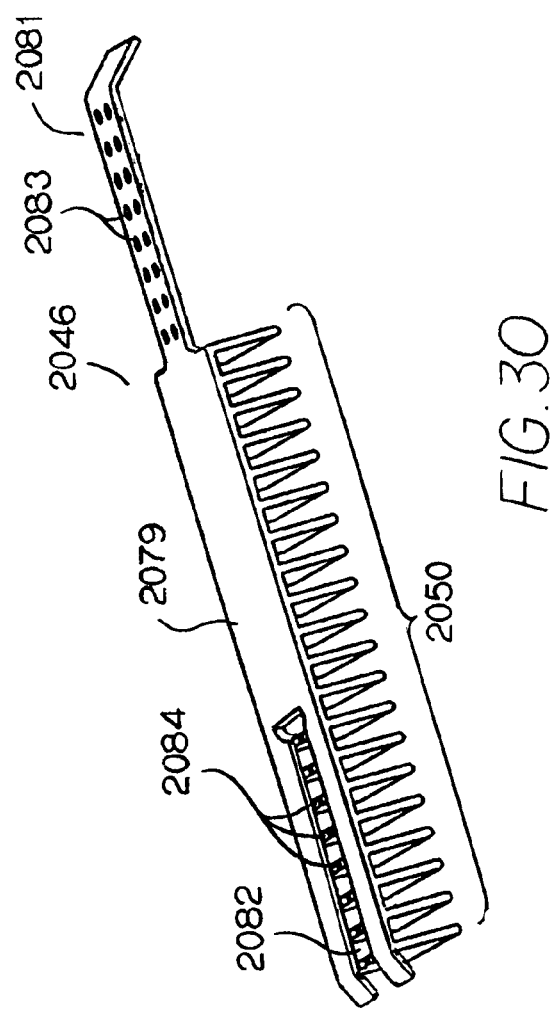
FIG. 30 shows another embodiment of a one-piece snap-on roller includes a flexible flat substrate, a plurality of ribs and a snap-fit closure means.

As shown in FIG. 30, another embodiment of a snap-on roller 2046 includes a flexible flat substrate 2079, a plurality of ribs 2050, and a snap-fit closure means. The top surfaces of the ribs 2050 define a bore for receiving an axle when the substrate 2079 is wrapped around an axle. The snap-fit closure includes a strap 2081 extending from a first side of the substrate that is thinner than the substrate and a slot 2082 extending into a second side of the substrate. The slot 2082 receives the strap 2081 when the substrate 2079 wraps around an axle. The strap 2081 includes a plurality of openings 2083 configured to receive projections 2084 on the ribs 2050 to secure the substrate 2079 in the rolled configuration.

Figure 31C:
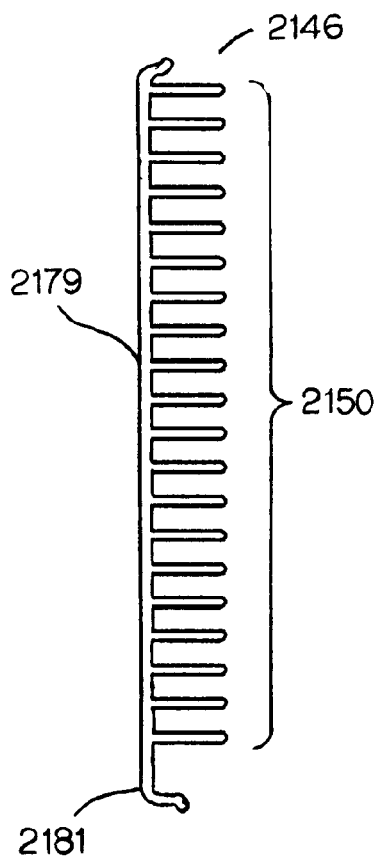
FIGS. 31A-C show another embodiment of a snap-on wrap-around roller.
Figure 31B:
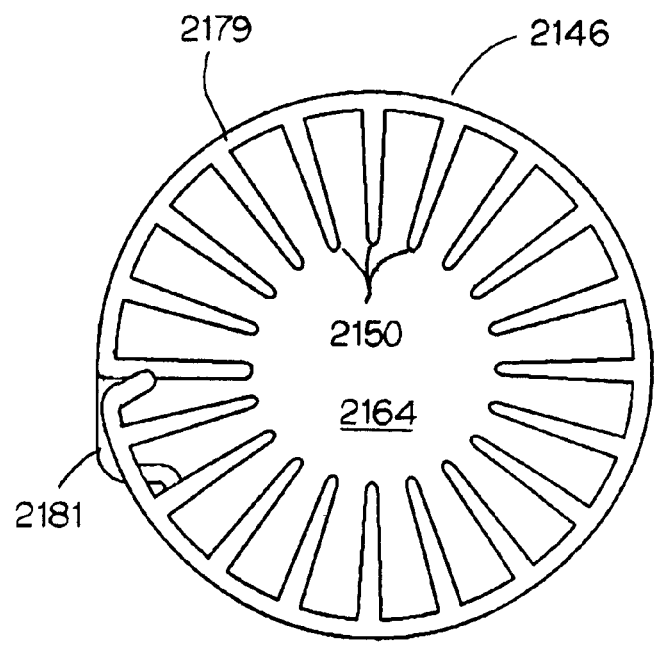
Figure 31A:
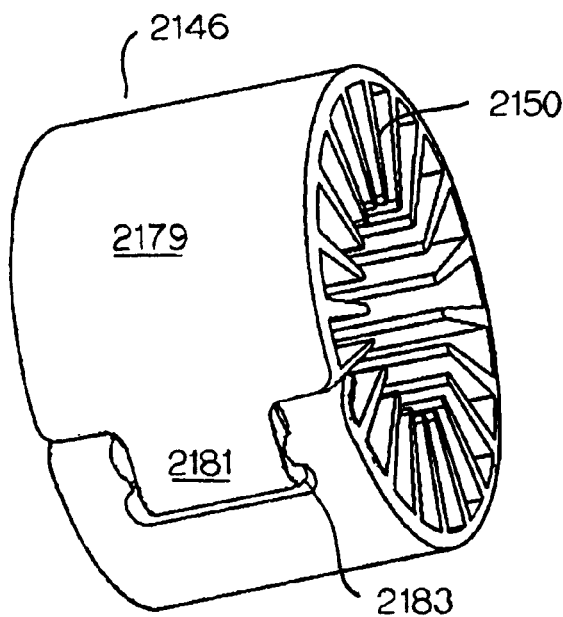

According to another embodiment of the invention, shown in FIGS. 31A-C, a snap-on roller 2146 may comprise a flexible substrate 2179, a plurality of ribs 2150 and a closure mechanism. The top surfaces of the ribs 2150 define a bore 2164 for receiving an axle when the substrate 2179 is wrapped around the axle. The closure mechanism comprises a strap 2181 extending from a first end of the substrate 2179, which fits with a slot 2183 in the second end of the substrate.

A snap-on roller of an illustrative embodiment of the invention is not limited to use in a conveyor belt module with a cavity, but rather can be implemented in any suitable system. For example, a snap-on roller of an illustrative embodiment of the invention may be used in a roller cradle assembly with an axle extending between two hinges, or with any device in which a snap-on roller would be useful. The axles or axle nubs could be fully supported between stanchions upstanding from the top side of the belt module. Or, selected hinge elements could be removed or made thin enough to reveal enough of the hinge pin to accommodate a snap-on roller.

The present invention has been described relative to certain illustrative embodiments. Since certain changes may be made in the described constructions without departing from the scope of the invention, it is intended that all matter contained in the description or shown in the accompanying drawings be interpreted as illustrative and not in a limiting sense.

What is claimed is:

1. A multi-piece roller for a conveyor belt, comprising:
a first roller section having a first torsioned channel defined by first and second side edges; and
a second roller section having a second torsioned channel defined by third and fourth side edges joined to the first roller section to form a complete roller having a first axial end, a second axial end, an outer peripheral surface between the first axial end and the second axial end, and a bore defined by the first and second torsioned channels and extending from the first axial end to the second axial end along a longitudinal axis,
wherein the first, second, third and fourth side edges are skewed relative to the longitudinal axis.

2. The multi-piece roller of claim 1, wherein:
the first roller section comprises a first base member defining the first torsioned channel and a first finger extending from the base member, and
the second roller section comprises a second base member defining the second torsioned channel and a second finger configured to engage the first finger.

3. The multi-piece roller of claim 2, wherein the first base member includes a radially outer surface configured to engage a radially inner surface of the second finger.

4. The multi-piece roller of claim 3, wherein the second base member includes a radially outer surface configured to engage a radially inner surface of the first finger.

5. The multi-piece roller of claim 2, wherein the first finger includes a contoured rotationally symmetric surface.

6. The multi-piece roller of claim 1, wherein the first roller section includes a base member, first finger extending from a first axial end of the base member on a first side of the first torsioned channel and a second finger extending from a second axial end of the base member on a second side of the first torsioned channel opposite the first finger.

7. The multi-piece roller of claim 6, wherein the first finger and the second finger include rotationally symmetric axially inner surfaces.

8. The multi-piece roller of claim 7, wherein the axially inner surfaces each include a first curved surface, a second curved surface, a first camming surface and a second camming surface.

9. The multi-piece roller of claim 7, wherein each axially inner surface includes a groove and a protrusion that is complementary to the groove.

10. The multi-piece roller of claim 6, wherein the first finger and second finger include radially outer surfaces that form a portion of the outer peripheral surface of the complete roller and radially inner surfaces that are non-parallel with the radially outer surfaces.

11. The multi-piece roller of claim 10, wherein the base member includes radially outer surfaces that are complementary to the radially inner surfaces of the first finger and the second finger.

12. The multi-piece roller of claim 6, wherein the first finger and the second finger include rounded tips.

13. The multi-piece roller of claim 1, wherein the first roller section is rotationally symmetric.

14. The multi-piece roller of claim 1, wherein the first and second torsioned channels include chamfered ends.

15. The multi-piece roller of claim 1, wherein the first axial end and second axial end of the complete roller are chamfered away from the bore.

16. A multi-piece roller for a conveyor belt, comprising:
a rotationally symmetric first roller section comprising a base member having an axially extending channel and a first finger extending from the base member, the first finger including an axially outer surface, an axially inner surface, a radially outer surface and a radially inner surface; and
a second roller section joined to the first roller section to form a complete roller having a first axial end, a second axial end, an outer peripheral surface defined at least in part by the first finger and a bore extending between the first axial end and the second axial end,
wherein the first finger includes a projection and the second roller section includes a groove for receiving the projection to lock the first roller section to the second roller section.

17. The multi-piece roller of claim 16, wherein the second roller section is rotationally symmetric.

18. The multi-piece roller of claim 16, wherein the first roller section comprises a torsioned channel in the base member defining a portion of the bore.

19. The multi-piece roller of claim 16, wherein the first finger extends from a first axial end of the base member and the first roller section further includes a second finger extending from a second axial end of the base member.

20. The multi-piece roller of claim 16, wherein the radially inner surface of the first finger is non-parallel with the radially outer surface of the first finger.

21. The multi-piece roller of claim 20, wherein the base member includes a radially outer surface that is complementary to the radially inner surface of the first finger.

22. The multi-piece roller of claim 21, wherein the radially inner surface of the first finger includes a camming surface, a groove and a curved surface defining a projection adjacent the groove.

23. The multi-piece roller of claim 16, wherein the axially inner surface of the first finger is rotationally symmetric.

24. The multi-piece roller of claim 23, wherein the axially inner surface has a curved distal portion, at least one groove and at least one projection.

25. The multi-piece roller of claim 16, wherein the first axial end and the second axial end of the complete roller are chamfered away from the bore.

26. A multi-piece roller for a conveyor belt, comprising:
a first roller section comprising a base member including an axially extending channel and a plurality of first fingers extending from the base member, each first finger including a radially outer surface and a radially inner surface that is non-parallel with the radially outer surface, and
a second roller section identical to the first roller section, the second roller section joined to the first roller section to form a complete roller having a first axial end, a second axial end, a bore extending from the first axial end to the second axial end, and an outer periphery between the first axial end and the second axial end, the outer periphery defined at least in part by the radially outer surfaces of the plurality of first fingers.

27. The multi-piece roller of claim 26, wherein the second roller section includes a base member having a plurality of second fingers, and the radially inner surfaces of the first fingers engage radially outer surfaces of the base member of the second roller section.

28. The multi-piece roller of claim 27, wherein the second fingers of the second roller section engage the first fingers of the first roller section when the complete roller is assembled.

29. The multi-piece roller of claim 27, wherein the first fingers are formed at opposing axial ends of the first base member and the second fingers are formed in an axially central portion of the second roller section base member.

30. The multi-piece roller of claim 26, wherein the first finger include flat distal ends that abut flat surfaces in the second roller section base member when the complete roller is assembled.

31. The multi-piece roller of claim 26, wherein the first fingers are formed at a first axial end of the first roller section and form a contoured opening for received a portion of the base member of the second roller section.

32. The multi-piece roller of claim 26, wherein the axially extending channel of the first roller section is torsioned.

33. The multi-piece roller of claim 26, wherein the axially extending channel of the first roller section includes chamfered ends.

34. The multi-piece roller of claim 26, wherein the first fingers each include a rotationally symmetric axially inner surface.

35. The multi-piece roller of claim 26, wherein the first roller section is rotationally symmetric.

36. The multi-piece roller of claim 26, wherein each of the first fingers has a first groove formed on the radially inner surface and an axially inner surface having a second groove that is coplanar with the first groove.

37. A roller section for forming a multi-piece roller in a conveyor belt, comprising:
a base member having an axially extending channel, and
a first finger extending from the base member, the first finger including an axially outer surface, a rotationally symmetric axially inner surface having a projection and a groove that is complementary to the projection, a radially outer surface and a radially inner surface.

38. The roller section of claim 37, wherein the radially inner surface of the first finger is non-parallel with the radially outer surface.

39. The roller section of claim 37, wherein the first finger is formed on a first axial end of the base member on a first side of the axially extending channel.

40. The roller section of claim 39, further comprising:
a second finger extending from a second axial end of the base member on a second side of the axially extending channel.

41. The roller section of claim 40, wherein the second finger includes a rotationally symmetric axially inner surface.

42. The roller section of claim 37, wherein the axially extending channel is torsioned.

43. The roller section of claim 37, wherein the axially extending channel includes chamfered ends.

44. The roller section of claim 37, wherein the axially inner surface includes at least two projections and at least two grooves that are complementary to the projections.

45. The roller section of claim 37, wherein the radially inner surface includes a projection and a groove.

46. The roller section of claim 45, wherein the base member includes a radially outer surface that is complementary to the radially inner surface of the first finger.

47. The roller section of claim 46, wherein the radially outer surface of the base member includes a curved section.

48. The roller section of claim 37, wherein the axially outer surface of the first finger chamfers towards a radially outer end.

* * * * *